US006623089B2

(12) United States Patent
Amberkar

(10) Patent No.: US 6,623,089 B2
(45) Date of Patent: Sep. 23, 2003

(54) ENHANCED YAW RATE ESTIMATION AND DIAGNOSIS FOR VEHICULAR APPLICATIONS

(75) Inventor: Sanket Amberkar, Ann Arbor, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 10/232,087

(22) Filed: Aug. 28, 2002

(65) Prior Publication Data

US 2003/0042790 A1 Mar. 6, 2003

Related U.S. Application Data

(60) Provisional application No. 60/315,654, filed on Aug. 29, 2001.

(51) Int. Cl.[7] ................................................. B60J 8/60
(52) U.S. Cl. ...................................................... 303/146
(58) Field of Search ....................... 303/122.05, 122.08, 303/122, 140, 193, 146, 147, 148; 180/197, 412; 364/426.015, 426.016; 701/1, 72

(56) References Cited

U.S. PATENT DOCUMENTS

| 5,366,291 A |   | 11/1994 | Nakagama et al. ......... 374/153 |
| 5,707,117 A | * | 1/1998  | Hu et al. ................. 303/122.08 |
| 6,198,988 B1| * | 3/2001  | Tseng .......................... 701/72 |

* cited by examiner

Primary Examiner—Christopher P. Schwartz
(74) Attorney, Agent, or Firm—Edmund P. Anderson

(57) ABSTRACT

A method for estimating the yaw rate of a vehicle. The method includes receiving at least one signal indicative of a vehicular lateral acceleration and receiving at least one signal indicative of a vehicular wheel velocity. A plurality of yaw rate estimation functions are provided. A first yaw rate estimation function of the plurality of yaw rate estimation functions is selected in response to at least one of the received signals. A first estimated yaw rate is estimated in accordance with the selected first yaw rate estimation function and at least two signals each indicative of a wheel velocity. If the first estimated yaw rate is not within a threshold value of an actual measured yaw rate, a second yaw rate estimation function is selected to obtain a second estimated yaw rate using a signal indicative of lateral acceleration for correlation with the actual measured yaw rate.

16 Claims, 22 Drawing Sheets

ENHANCED YAW RATE ESTIMATION AND DIAGNOSIS FOR VEHICULAR APPLICATIONS

CROSS-REFERENCE TO RELATED APPLICATIONS

This application claims the benefit of U.S. provisional application No. 60/315,654, filed Aug. 29, 2001 the contents of which are incorporated by reference herein in their entirety.

BACKGROUND

A vehicle dynamic control system, such as, for example, an active steering system, an active braking system and/or an active traction control system, may be responsive to a time-wise rate of change in the yaw angle ("yaw rate"), generally expressed in radians per second. In an active steering system, for example, the yaw rate may be monitored in order to generate a steering angle output that is additive to an operator commanded steering angle during severe maneuvers. In order to correct transient steering instabilities, such an active steering system may control a vehicle more quickly and accurately than an average driver.

Since 1996 brake suppliers have offered vehicle stability systems which use differential braking to improve the handling feel for vehicles operating on slick surfaces. These systems typically employ a yaw rate sensor to detect unwanted vehicle slew from the driver's intended path and apply pressure to the brakes on one wheel to bring the vehicle back to the desired attitude. For example, in over-steer conditions, where the rear end of the vehicle starts to spin out, loss of tire adhesion to the roadway prevents the rear tires from exerting a restoring force to return the vehicle to the desired attitude. Thus for optimum vehicle stability, a brake stability system is recommended to provide differential braking to the front wheels (which still retain good roadway adhesion) for control of the over-steer spinout. Failure of a yaw sensor could provide an unwanted brake drag in this control system. Accordingly, these brake systems must provide a sensitive diagnostic to disable the stability function when the yaw rate sensor has failed.

A four-wheel active steering system may steer the front and the rear wheels of a vehicle. More specifically, a rear wheel steering portion of the system may produce a desired rear wheel steering angle to achieve tight turning radii at low speeds by steering the front and rear wheels in different directions to thereby reduce the effective turning radius of the vehicle. At generally higher speeds, the four-wheel active steering system may enhance cornering stability by steering the front and the rear wheels in relatively similar directions.

Many motor vehicle handling instabilities are generally manifested as a function of the yaw rate of the vehicle. For example, the yaw rate may be influenced by transient changes in the relative slip angles of the tires while the vehicle is negotiating a corner at or near the situation-specific limits of adhesion in the presence of irregular road surface conditions. An increase in slip angle at one end of the vehicle generally leads to more lateral movement of that end relative to the other end to thereby affect the yaw rate.

The use of rear wheel steering to provide vehicle yaw stability allows very quick system response and provides a very smooth transition to a new desired vehicle track when changing lanes on slick road surfaces. Under most conditions, it does not require the brakes to activate during the transition. This eliminates the normal deceleration tugs required by the braking system to correct undesired veer in the lane change maneuver. Unfortunately, the quick response provided by the steer controller places greater demands upon the detection logic used for verification that the yaw rate sensor in the system is functioning properly. For the slower response of the brake stability system a fault detection process that allows several seconds to respond to a sensor failure provides adequate assurance that the vehicle driver is not subjected to a stressful operating condition. In a steer stability system a maximum yaw sensor error must be diagnosed in less than a second to prevent an undesired veering into an adjacent roadway lane. Thus, there is a desire to enhance yaw rate estimation for comparison with yaw rate sensor measurements to quickly detect sensor errors. The true challenge for any automotive stability control system is the ability to rapidly identify a system failure. The system must respond quickly to changing environments, which could lead to loss of control, but at the same time must detect any sensor failure that might mimic a loss-of-control situation.

SUMMARY

The above described and other features are exemplified by the following Figures and Description in which a vehicular system is disclosed that controls the method for estimating the yaw rate using other sensors for correlation with an actual measured yaw rate from a yaw rate sensor. The method includes receiving at least one signal indicative of a vehicular lateral acceleration and receiving at least one signal indicative of a vehicular wheel velocity. A plurality of yaw rate estimation functions are provided. A first yaw rate estimation function of the plurality of yaw rate estimation functions is selected in response to at least one of the received signals. A first estimated yaw rate is estimated in accordance with the selected first yaw rate estimation function and at least two signals each indicative of a wheel velocity. If the first estimated yaw rate is not within a threshold value of an actual measured yaw rate, a second yaw rate estimation function is selected to obtain a second estimated yaw rate using a signal indicative of lateral acceleration for correlation with the actual measured yaw rate. If the second estimated yaw rate is not within the threshold value, a signal indicative of a yaw rate sensor fault is generated.

BRIEF DESCRIPTION OF THE DRAWINGS

Exemplary embodiments will now be described by way of example with reference to the accompanying drawings wherein like reference numerals designate like features in the several figures, in which.

DETAILED DESCRIPTION OF PREFERRED EMBODIMENTS

Figure 1:
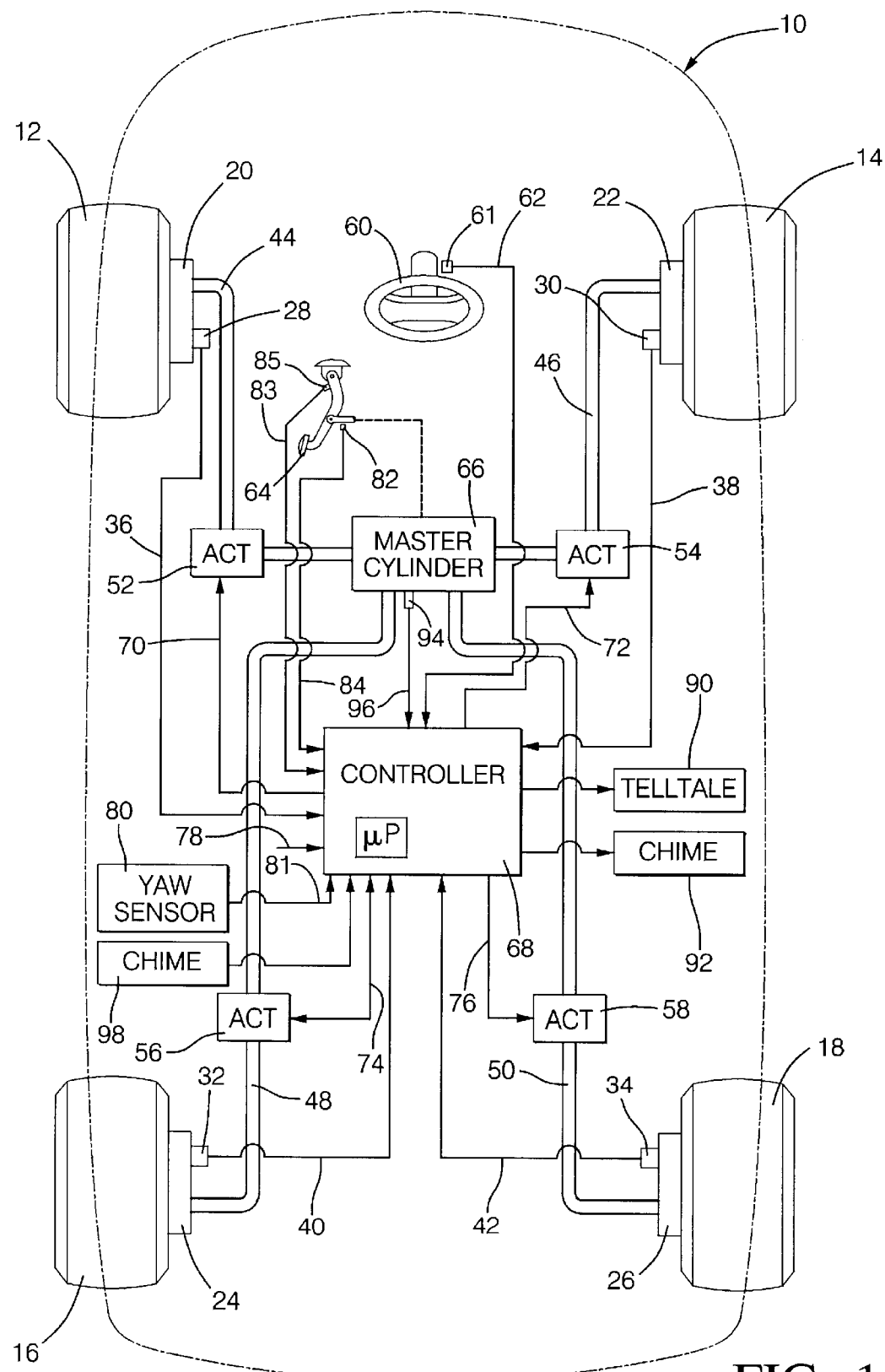
FIG. 1 is a schematic diagram of an active brake control system employed with a vehicular stability control system.
Figure 2:
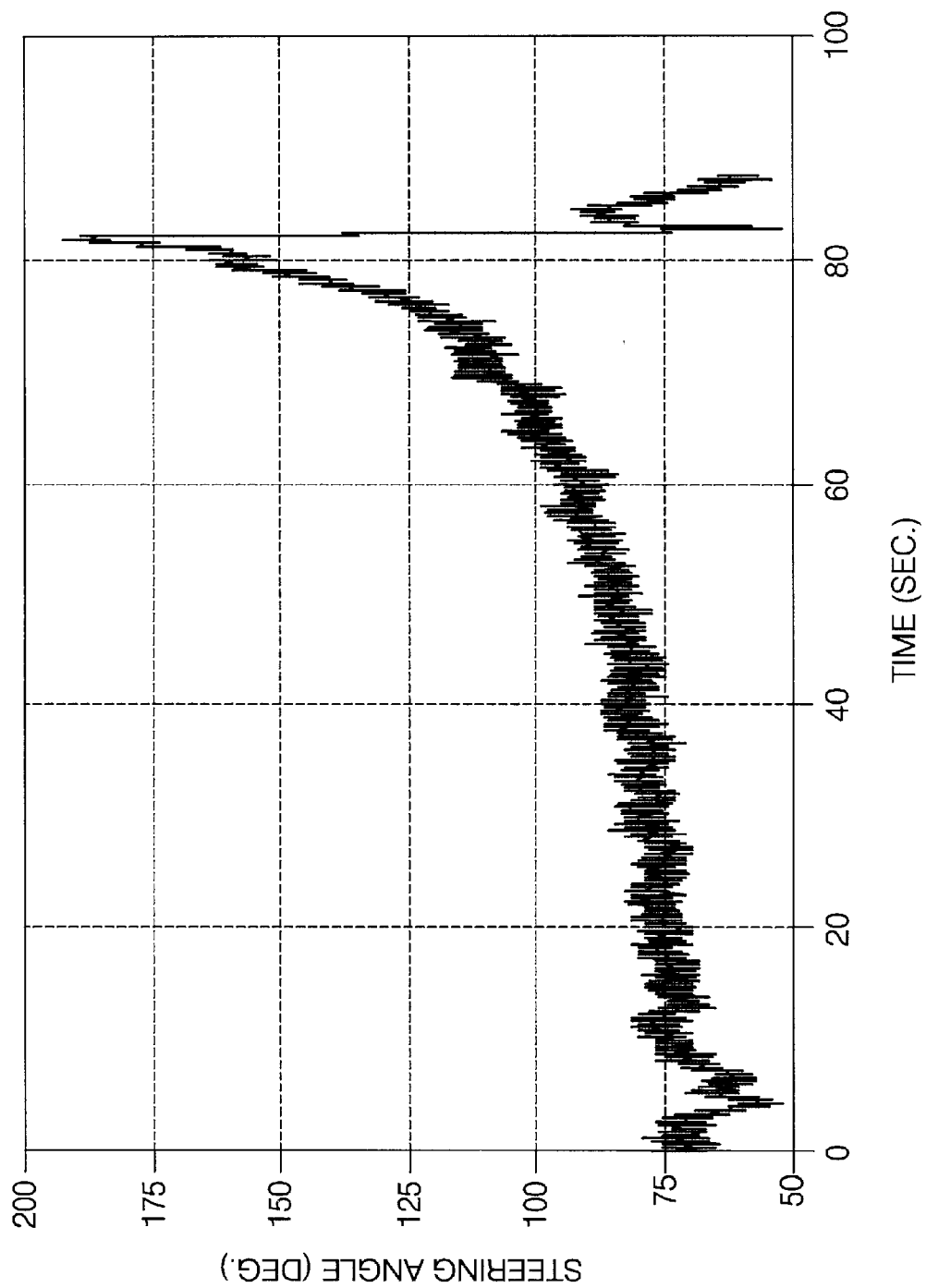
FIGS. 2–5 illustrate vehicle responses to a first test maneuver that includes coming at a constant radius with speed varied up to a lateral force limit of almost 1 g.
Figure 3:
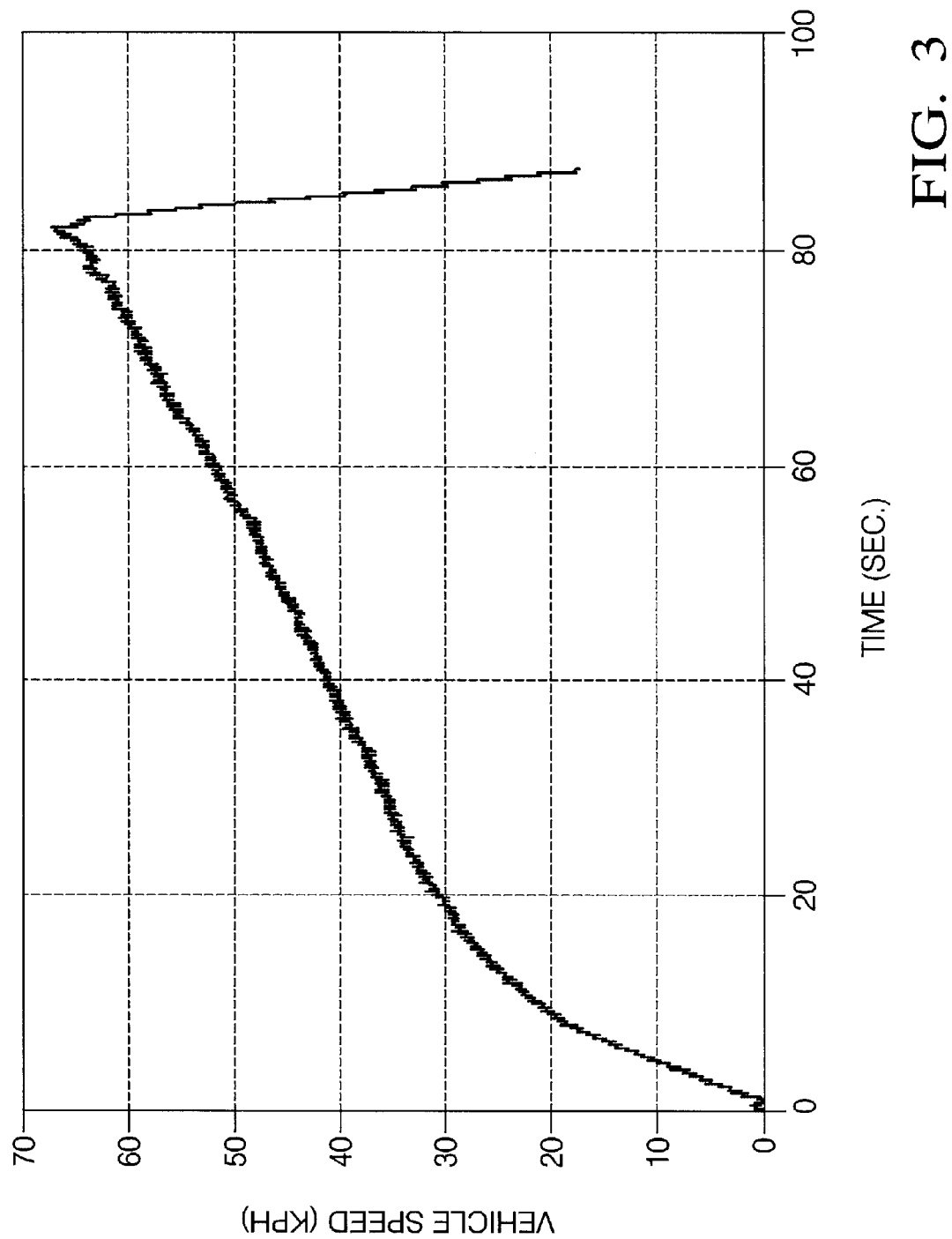

Referring to FIG. 1, automotive vehicle 10 includes an active brake control system with a conventional microprocessor ($\mu$P) based controller 68 for controlling brakes 20, 22, 24, and 26, for respective vehicle wheels 12, 14, 16, and 18. The controller 68 includes such conventional elements (not shown) as a central processing unit (CPU) having control circuitry and arithmetic logic circuitry, memory devices including read only memory devices (ROM) for permanent read only data storage and random access memory devices (RAM) for both volatile and nonvolatile read/write data storage.

The controller 68, when activated in response to manual application of ignition power thereto, executes a series of control and diagnostic operations for reading various input signals applied thereto and for issuing control and diagnostic signals to various vehicle actuators and indicators. The input signals applied to the controller 68 include an output signal on line 81 from a conventional yaw rate sensor 80, an output signal on line 99 from conventional accelerometer 98 indicating lateral vehicle acceleration, an output signal on line 62 from a conventional digital steering wheel angle sensor 61 indicating the degree of rotational displacement of steering wheel 60 away from a predetermined initial angle, output signals on lines 36, 38, 40, and 42 from respective conventional wheel speed sensors 28, 30, 32, and 34, output signal on line 83 from conventional brake pedal displacement sensor 83 indicating a degree of depression of the brake pedal 64 away from a rest position, output signal on line 84 from conventional brake pedal switch 82 indicating whether the brake pedal is depressed away from a rest position, and vehicle speed signal on line 78, such as from a conventional vehicle speed sensor located in the transmission, for example. Redundant sensors may be provided for the above sensors to improve fault detection or tolerance. For example, conventional analog steer angle sensors (not shown) may be provided in addition to digital steer angle sensor 61 for transducing a steer angle signal substantially redundant with the digital steer angle 61 output signal on line 62.

The described conventional sensors 28, 30, 32, 34, 61, 80, 82, 85, and 98 are implemented in a manner generally known to those possessing ordinary skill in the art. Vehicle ignition voltage is applied to the sensors and actuators of FIG. 1 substantially at the time ignition voltage is manually applied to controller 68, to energize such sensor and actuators in a manner generally understood in the art.

The control operations of controller 68 provide for vehicle braking control in a plurality of control modes including a base braking mode, an anti-lock braking mode, a traction control braking mode, and a closed-loop yaw rate control mode. The base braking mode provides for application of braking pressure to brakes 20, 22, 24, and 26 in proportion to a detected degree of manual depression of brake pedal 64 by a vehicle operator. The brake pedal depression operates to drive a piston (not shown) within master cylinder 66 of a conventional form which reduces a braking system control volume as is generally understood in the art, increasing the hydraulic pressure in brake lines 44, 46, 48, and 50, thereby increasing braking pressure at the wheels 12, 14, 16, and 18.

Conventional pressure transducer 94 disposed within the master cylinder 66 transduces brake fluid pressure within the master cylinder into an output signal applied to controller 68, indicating the degree of displacement of the brake pedal 64. Controller 68 generates and outputs brake pressure modulation commands to dedicated brake pressure control actuators 52, 54, 56, and 58 for varying the braking pressure at the respective wheels 12, 14, 16, and 18 away from the manually applied pressure.

The actuators 52, 54, 56, and 58 may take the form of generally known reciprocating piston actuators including a DC motor mechanically linked to a reciprocating piston to drive the piston so as to vary the control volume and thus vary the brake control pressure applied to the brakes 20, 22, 24, and 26. Alternatively, the actuators 52–58 may include simple, conventional solenoid valves for selectively coupling brakes 20–26 to a hydraulic control volume under pressure for increasing braking pressure and for selectively coupling brakes 20–26 to a reservoir (not shown) for relieving braking pressure. Alternatively, certain of the brakes 20–26 may be electric motor driven brakes, such as described in the U.S. Pat. No. 5,366,291, assigned to the assignee of this application.

In an anti-lock braking maneuver, the controller 68 varies the braking pressure at the brakes 20, 22, 24, and 26, to maximize braking pressure while minimizing any detected wheel slip condition, as is generally understood in the art. In a traction control maneuver, the controller 68 varies braking pressure at the brakes 20, 22, 24, and 26 to minimize a detected wheel slip condition. In a closed-loop yaw rate control application in which, during a detected vehicle turning maneuver, a difference between a desired yaw rate, determined as a function of steering wheel angle and rate of change in steering wheel angle and as a function of vehicle speed and lateral vehicle acceleration, provided through the described sensors of FIG. 1, and actual yaw rate as provided by yaw rate sensor 80 of FIG. 1, active braking control is provided, wherein individual or collective braking command signals are applied to the actuators 52–58 in a manner predetermined to controllably drive the yaw rate difference toward zero.

To accurately diagnose the operability of the active braking control system, including the sensors of FIG. 1 provided for indicating actual and desired yaw rate, so the negative effect on vehicle performance associated with unnecessary active braking may be avoided whenever possible yet without misdiagnosing active brake control fault conditions, diagnostic operations are carried out in a step by step manner by the controller 68 while the controller is operating. Generally, individual sensor diagnostics are periodically carried out, sensor to sensor correlation diagnostics are periodically carried out, and sensor to control system correlation diagnostics are periodically carried out to accurately yet rapidly diagnose the operability of the active brake control system in accord with this disclosure.

The diagnostics may be carried out when the active brake control system is activated in response to a detected vehicle turning maneuver, for example during detected turning maneuvers characterized by a high yaw rate error.

Alternatively, the diagnostics may be continuously carried out while the controller 68 is operating regardless of whether the active brake control system is activated. Upon detection or diagnosis of an active brake control system fault condition and in accord with an important aspect of this disclosure, the active brake control system is automatically deactivated to rapidly minimize the potential negative impact of unnecessary vehicle supplemental braking. Information descriptive of the type and severity of the diagnosed fault condition may further be logged in a controller 68 memory device to facilitate off-line service procedures and may be indicated to the vehicle operator so that such service procedures may be initiated.

More specifically, the diagnostic uses information from other sensors that are available to enhance the estimation of yaw rate to compare with a measurement obtained from yaw rate sensor 80 following application of ignition power to the controller 68. If a yaw rate sensor fault is detected, then the active brake control operations are suspended for the duration of such diagnosed fault condition and an indication of such fault condition and the suspension of active brake control operations is made to the vehicle operator, such as by illuminating an indicator visible to a vehicle operator, such as telltale 90 of FIG. 1, or by energizing a chime audible to the vehicle operator, such as chime 92 of FIG. 1.

It will be recognized by one skilled in the art that although enhanced yaw rate estimation is disclosed in conjunction with an active brake control system, enhanced yaw rate estimation can be used with other vehicle stability control systems, such as rear wheel steering. Independent steer of the rear wheels (using guidance from yaw rate sensor 80 and lateral accelerometer 98) may be used to provide attitude correction more quickly and less intrusively than a braking system. Enhanced yaw rate estimation is particularly useful with an integrated steer/brake vehicle stability control system where use of rear wheel steering to provide vehicle yaw stability allows very quick system response. However, in the event of a yaw rate sensor fault, the quick response provided by the steer controller may undesirably cause the vehicle to veer into an adjacent lane that is difficult to quickly counter by driver input. Thus, it is desirable to verify a correlation between measured and estimated yaw rate in a wide spectrum of vehicle operating conditions, i.e., linear and nonlinear, to quickly detect a yaw rate sensor fault.

The enhanced yaw rate estimation disclosed herein uses information already available through the sensors presently employed in the vehicle illustrated in FIG. 1. Specifically, the sensors include wheel speed sensors 28, 30, 32, and 34 for the driven and non-driven wheels, lateral accelerometer 98, and effective vehicle speed signal on line 78 (most likely derived from the transmission). In addition, the vehicle geometry, in the form of track width and wheelbase, is assumed to be known for use in estimating yaw rate. As discussed above, the underlying signals used for yaw rate estimation are themselves checked by some form of local diagnosis.

The current vehicle stability control diagnostics use wheel speed signals and knowledge of the track width for estimation of yaw rate or expected yaw rate. A first method includes using the non-driven wheel speed signals (front) and track width to estimate the expected yaw rate. A second method includes using the driven wheel speed signals (rear) and track width for yaw rate estimation. The estimated yaw rate is equal to the wheel speed difference measured on the left and right sides of the vehicle divided by the track width between the wheels.

In an exemplary embodiment, estimation of yaw rate includes two more methods including a third method using lateral acceleration signal 99 and effective vehicle speed signal 78, wherein the estimated yaw rate is equal to the lateral acceleration measurement divided by the effective vehicle speed measurement. A fourth method includes using all four wheel speeds signals and associated track width.

FIGS. 2–5 illustrate actual vehicle response characteristics over time when a driver in a selected vehicle tracks a constant radius circle (40 m) while the vehicle speed is increased from zero to a speed in which an effective maximum lateral gravitational force limit of the vehicle is reached (e.g., almost 1 g). The vehicle transitions into the nonlinear operating range at some point after 0.5 g. Most current estimators used for yaw rate estimation work up to this point using front or rear wheel speed signals and associated track width, i.e., the first and second methods for yaw rate estimation discussed above.

Current vehicle stability control diagnostics employing an active brake control system are used only when the vehicle is operating in a vehicle stability enhancement (VSE) mode and switch between the first and second methods or non-driven to driven wheel speeds when the respective wheel speed signals may be corrupted as a result of an anti-lock braking system (ABS) maneuver. While the first and second methods using front and rear wheel speed signals, respectively, may suitably estimate yaw rate in the linear region of vehicle operation, as seen in FIGS. 6 and 7, the first and second methods using either front or rear wheel speed signals with track width do not adequately estimate yaw rate in the nonlinear vehicle operating region.

Figure 4:
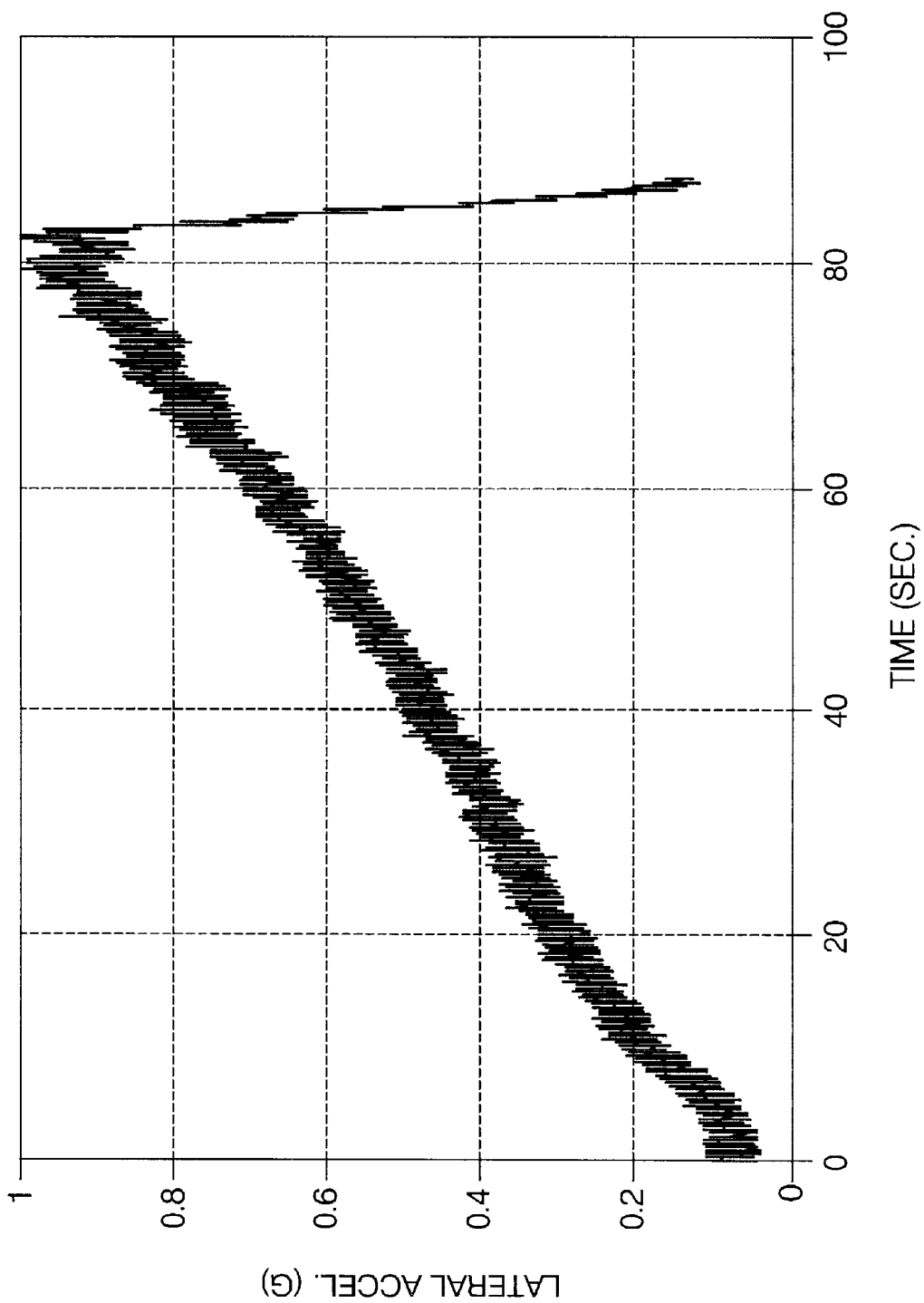
Figure 5:
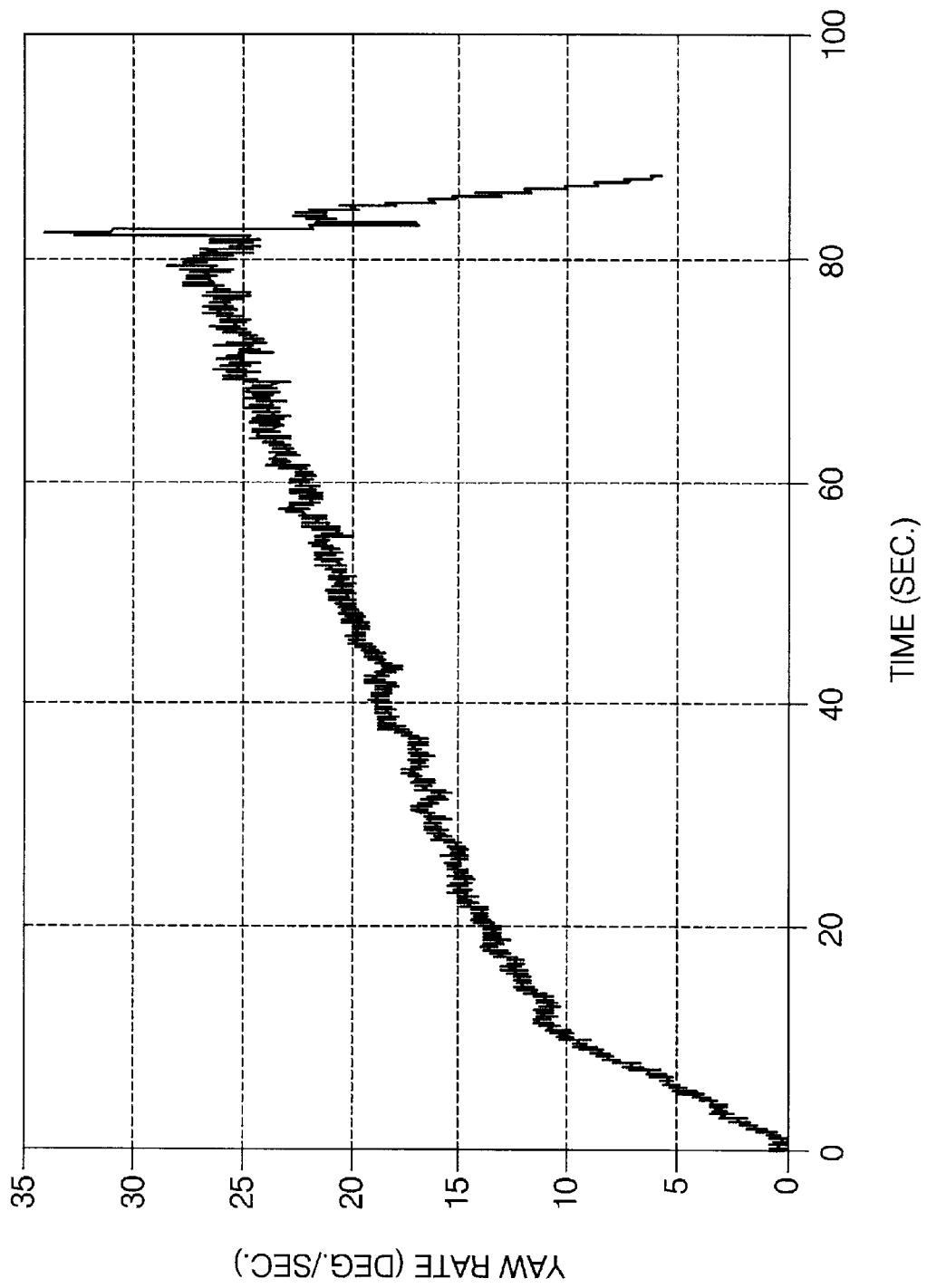
Figure 6:
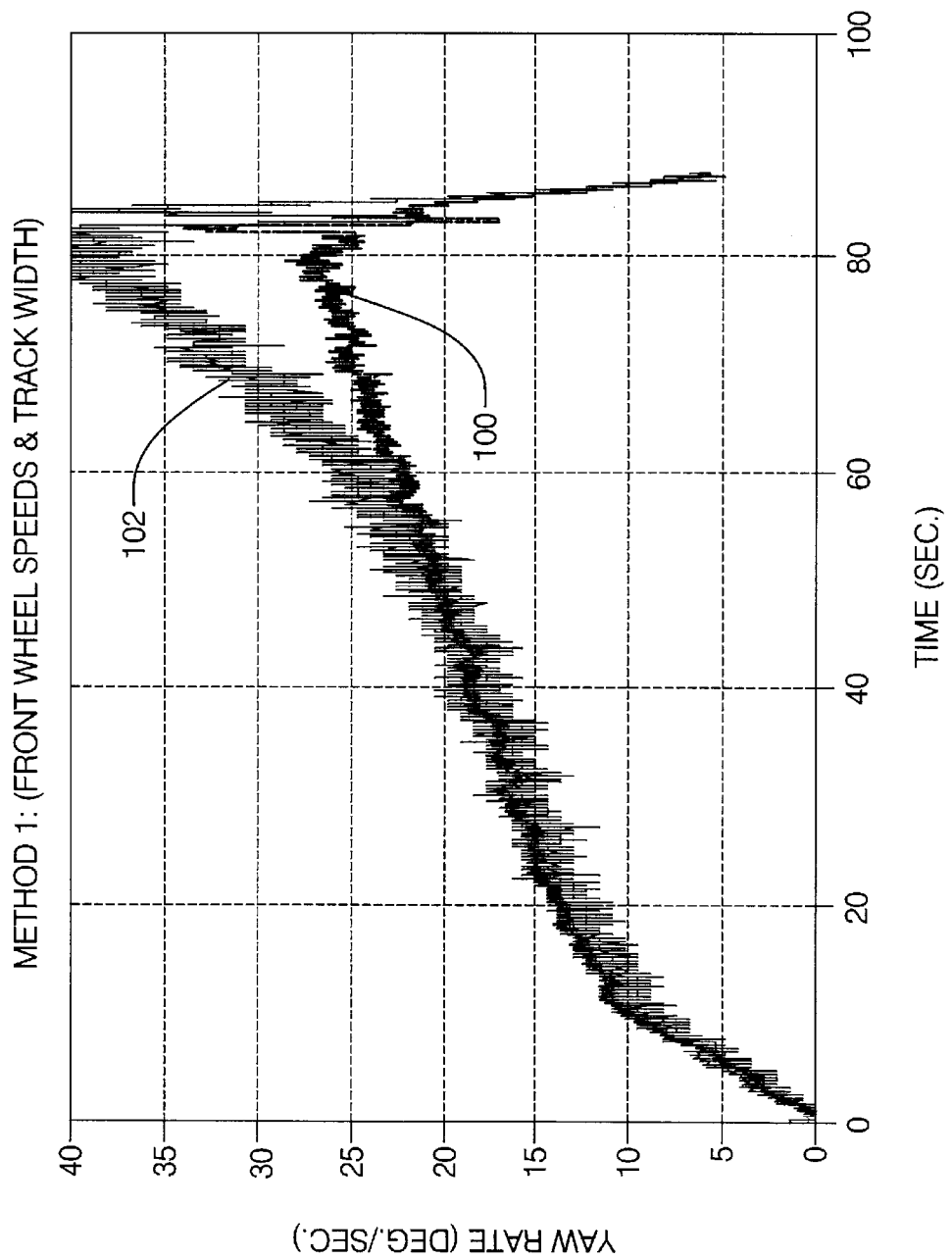
FIGS. 6–9 illustrate actual and measured yaw rates using four different yaw rate estimations of the test maneuver of FIGS. 2–5.
Figure 7:
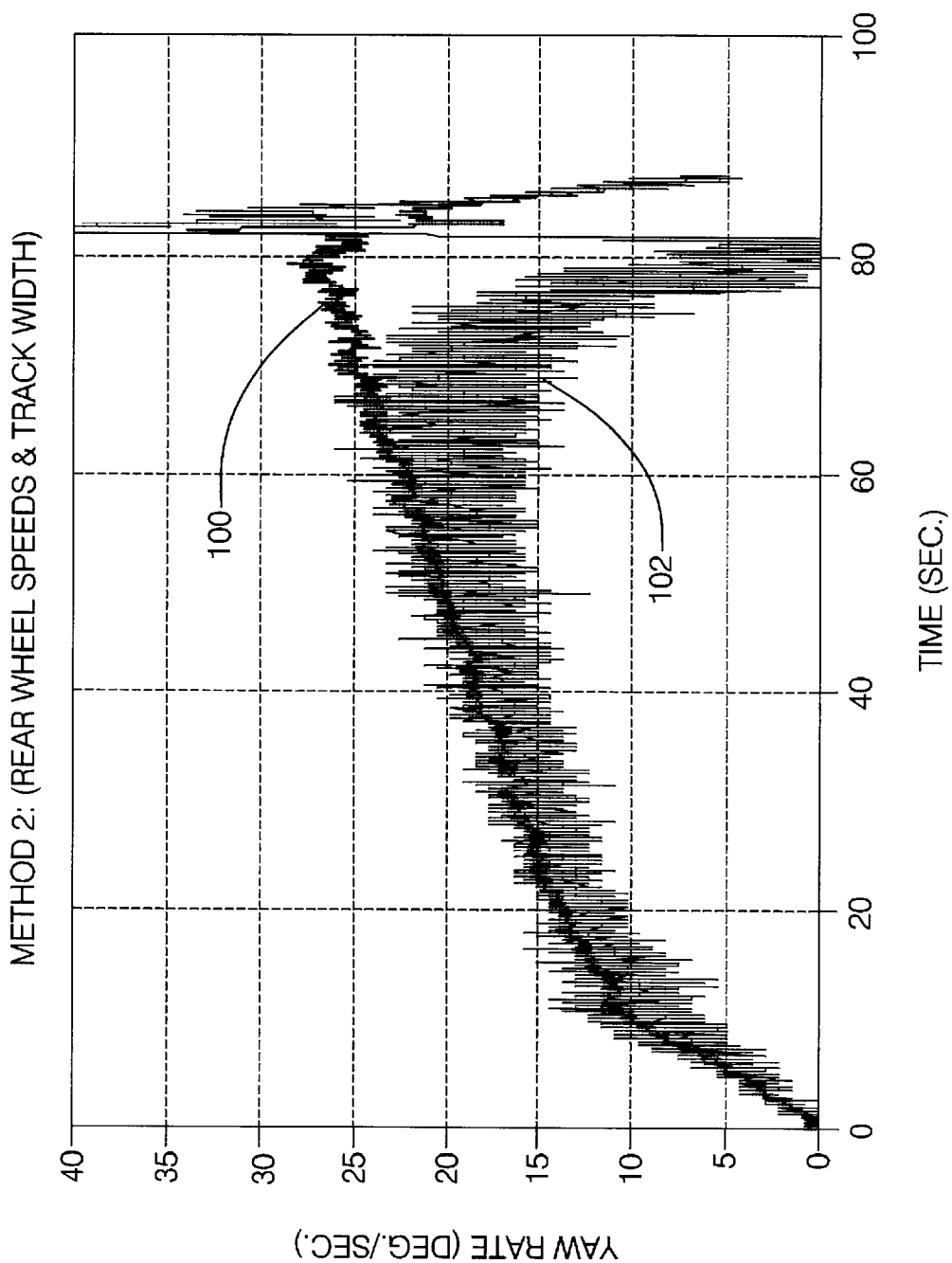

Still referring to FIGS. 6 and 7, the actual yaw rate sensor measurement is indicated at 100 while the yaw rate estimation is indicated at 102. As will be recognized with reference to FIGS. 6 and 7, the first method using front wheel speed signals and associated track width overestimates the yaw rate in the nonlinear region while the second method using the rear wheel speed signals and associated track width underestimates the yaw rate. It will be further recognized that the nonlinear region coincides with a maximum lateral gravitational force limit of just over about 0.5 g at which point the vehicle enters a nonlinear operating region. The nonlinear region just after about 0.5 g occurs at about 50 seconds with reference to FIG. 4 illustrating lateral acceleration (g) with respect to time in seconds. It will be recognized with reference to FIGS. 6 and 7 that it is at about this time (i.e., 50 seconds) that the estimated yaw rate and actual yaw rate start to diverge. Thus, FIGS. 6 and 7 reflect a need for an enhanced yaw rate estimator for correlation with actual yaw rate sensor measurement in nonlinear operating conditions for use in yaw rate sensor diagnostics.

Figure 8:
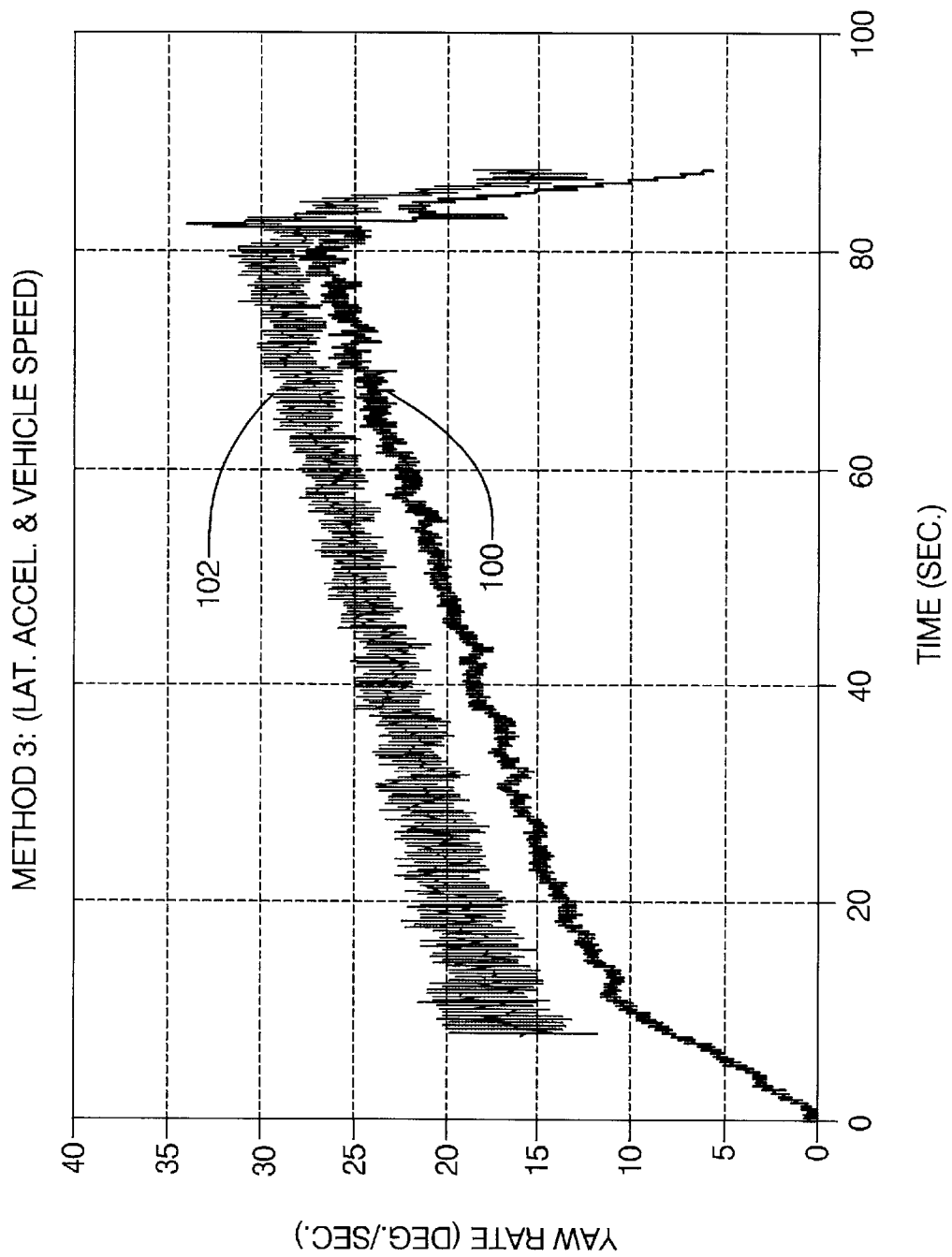

Referring now to FIG. 8, it will be seen that when lateral acceleration signal 99 and vehicle speed signal 78 (i.e., third method) are used to estimate yaw rate that the estimated signal 102 overestimates the actual yaw rate sensor measured signal 100. However, as the vehicle approaches a nonlinear operating condition, the estimated signal 102 converges toward the actual signal 100. Although the third method provides a closer yaw rate estimate in the nonlinear region, it is not as accurate at low speeds because of the dependence on vehicle speed signal 78 which looses its reliability at very low speeds combined with an extremely low lateral acceleration signal 99 at low speeds.

Figure 9:
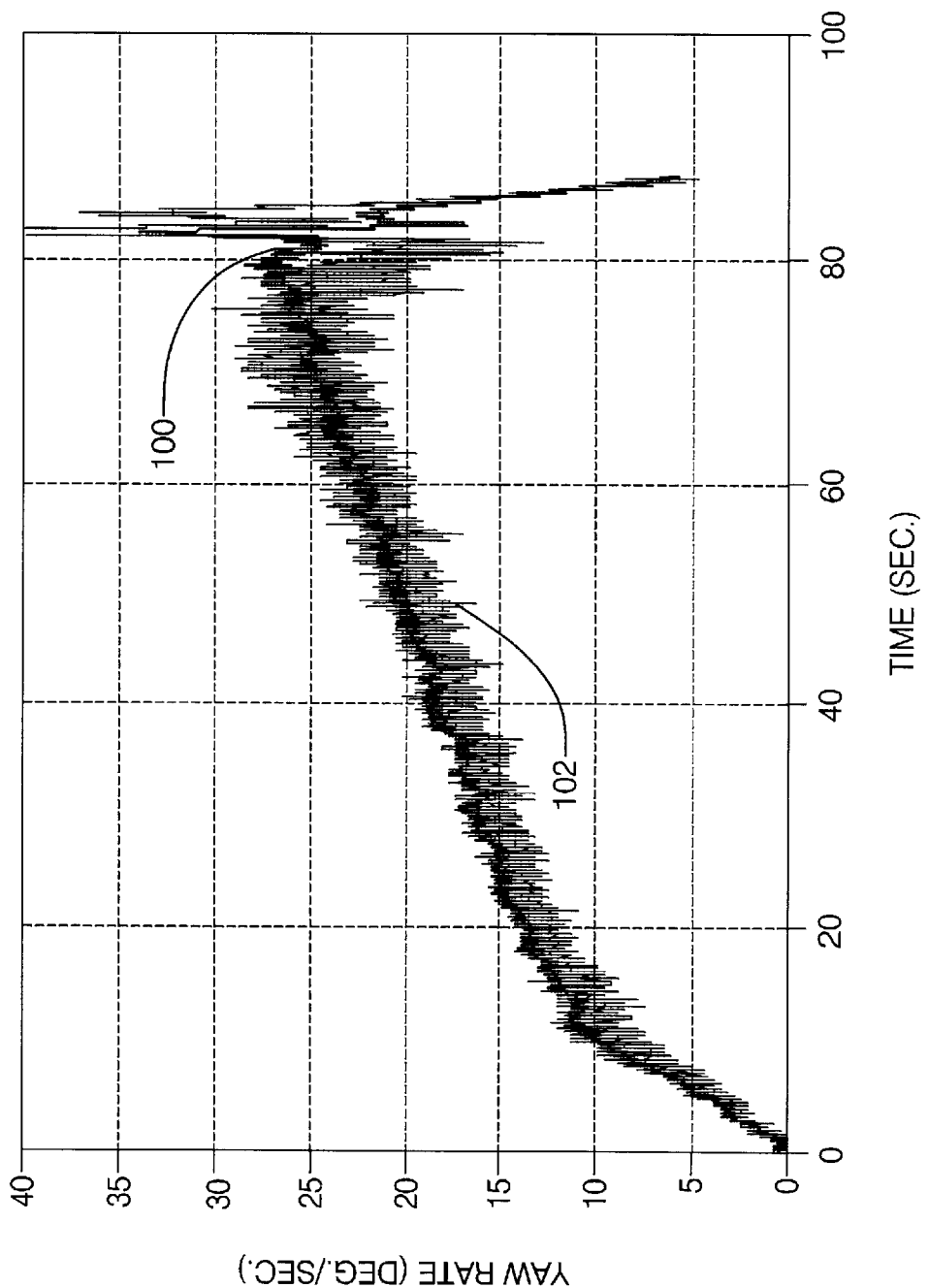
Figure 10:
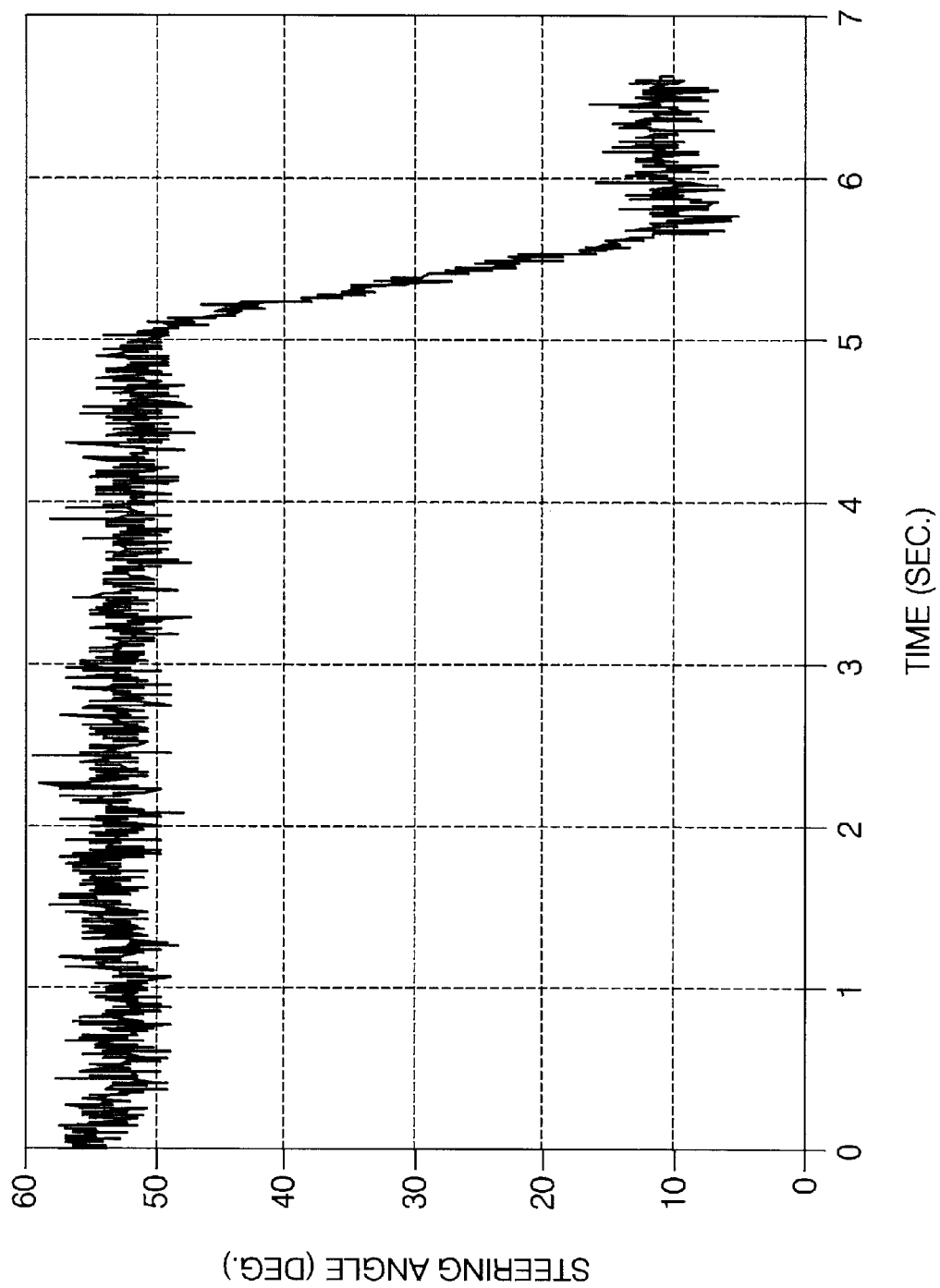
FIGS. 10–13 illustrate vehicle responses to a second test maneuver that includes maintaining a constant radius with a constant speed until a hard brake is applied activating the ABS mechanism.
Figure 11:
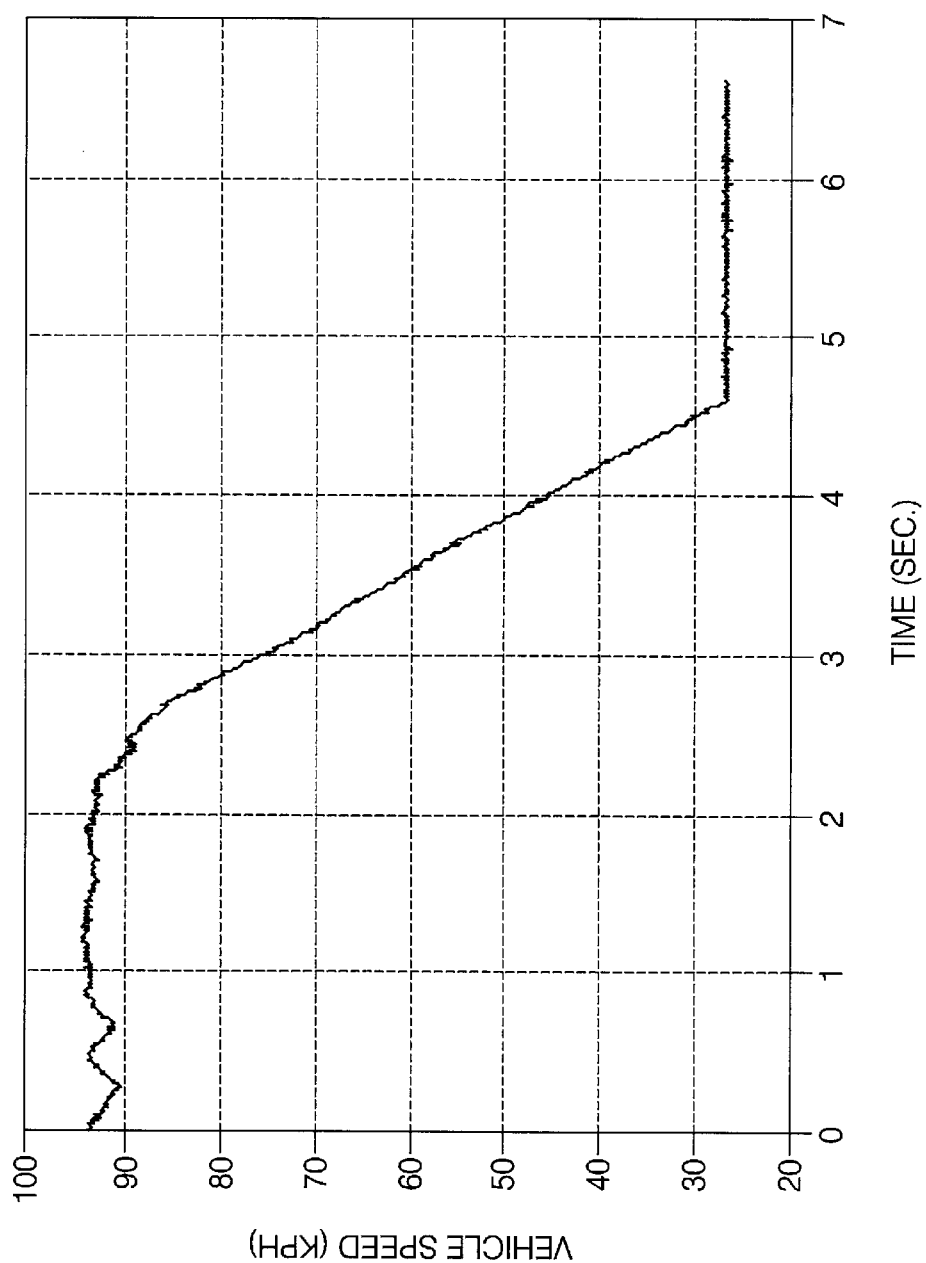
Figure 12:
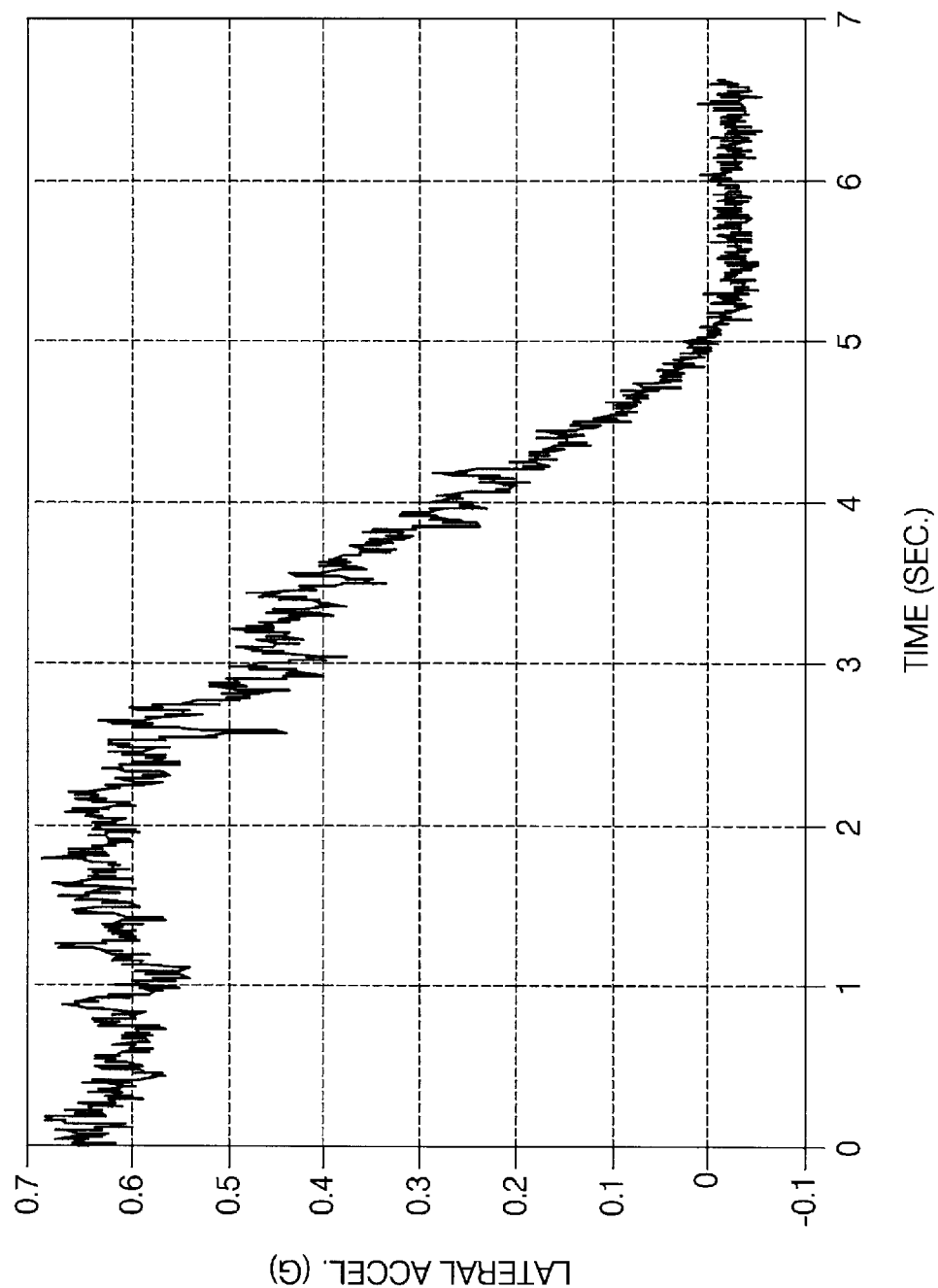
Figure 13:
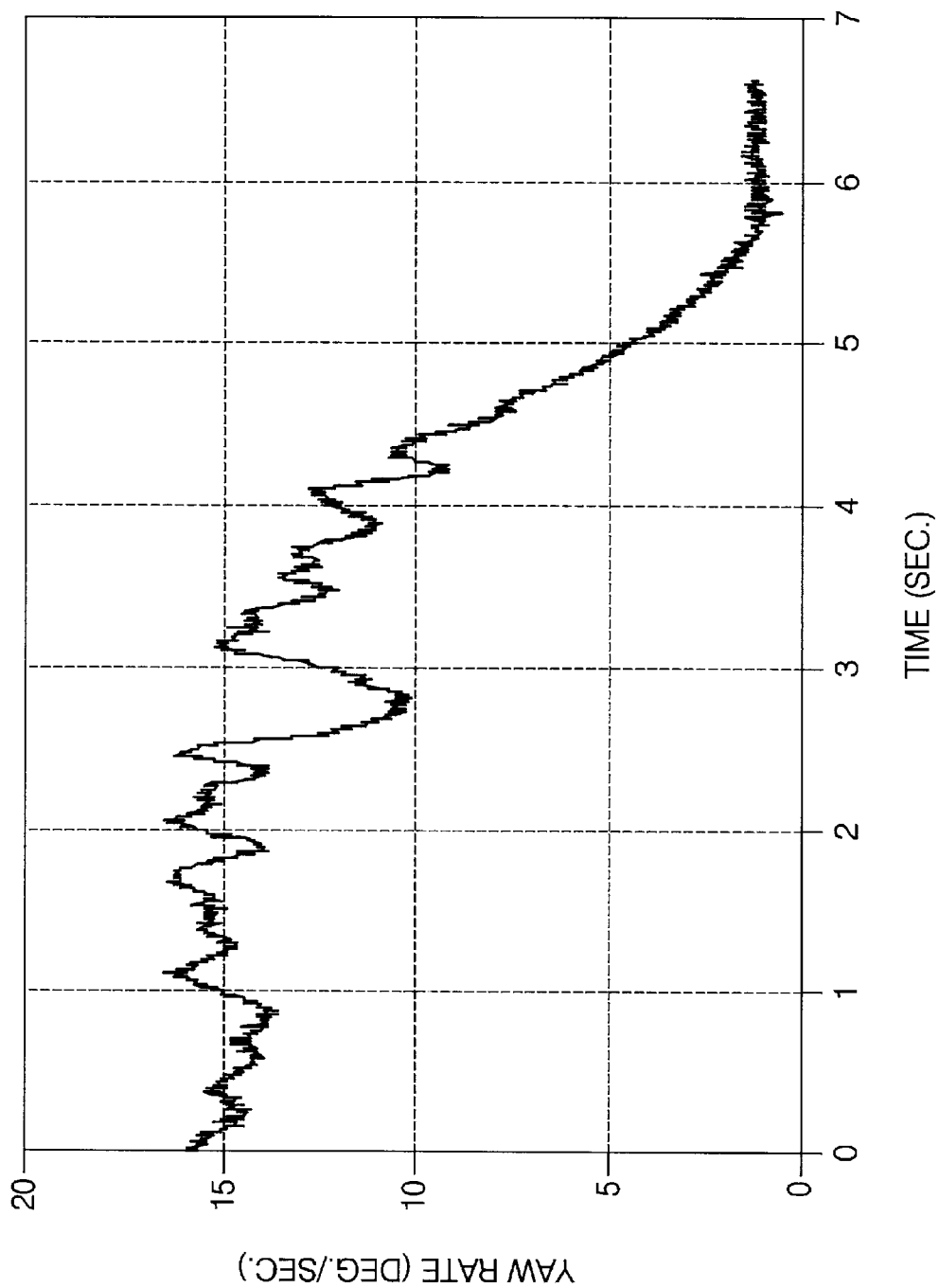

Referring now to FIG. 9, the fourth method is exemplified using front and rear wheel speed signals and associated track widths. The fourth method performs better than the other three yaw rate estimation methods in the above described driving maneuver providing correlation in both linear and nonlinear vehicle operating conditions.

FIGS. 10–13 illustrate actual vehicle response characteristics over time with respect to rigorous-testing of the above described estimation methods employing a different driving maneuver that includes ABS activation. In this maneuver, the driver initially maintains a constant radius turn with the vehicle speed kept constant to produce a lateral acceleration of 0.62 g on a wet asphalt surface. Brake pedal 64 is then depressed producing a hard brake apply situation (equivalent to a 0.82 g deceleration) while the driver adjusts the steering input to maintain the turn. Due to the severity of applying brake pedal 64, the ABS mechanism is activated. It will be recognized by one skilled in the pertinent art that this in turn causes the wheel speed signals to no longer accurately represent the actual vehicle speed. The measured vehicle responses over time to the maneuver are shown in FIGS. 10–13.

As mentioned above and referring to FIGS. 14, 15, and 17, it is recognized that the estimators using wheel speed information (first method, second method and fourth method) fail to provide a reliable representation of the vehicle yaw rate during the ABS brake modulation. In fact, as reflected in FIG. 17, the fourth method, which uses all for wheel signals, provides a very poor estimate under this hard braking condition contrasted with the previously described driving maneuver with specific reference to FIG. 9.

Figure 14:
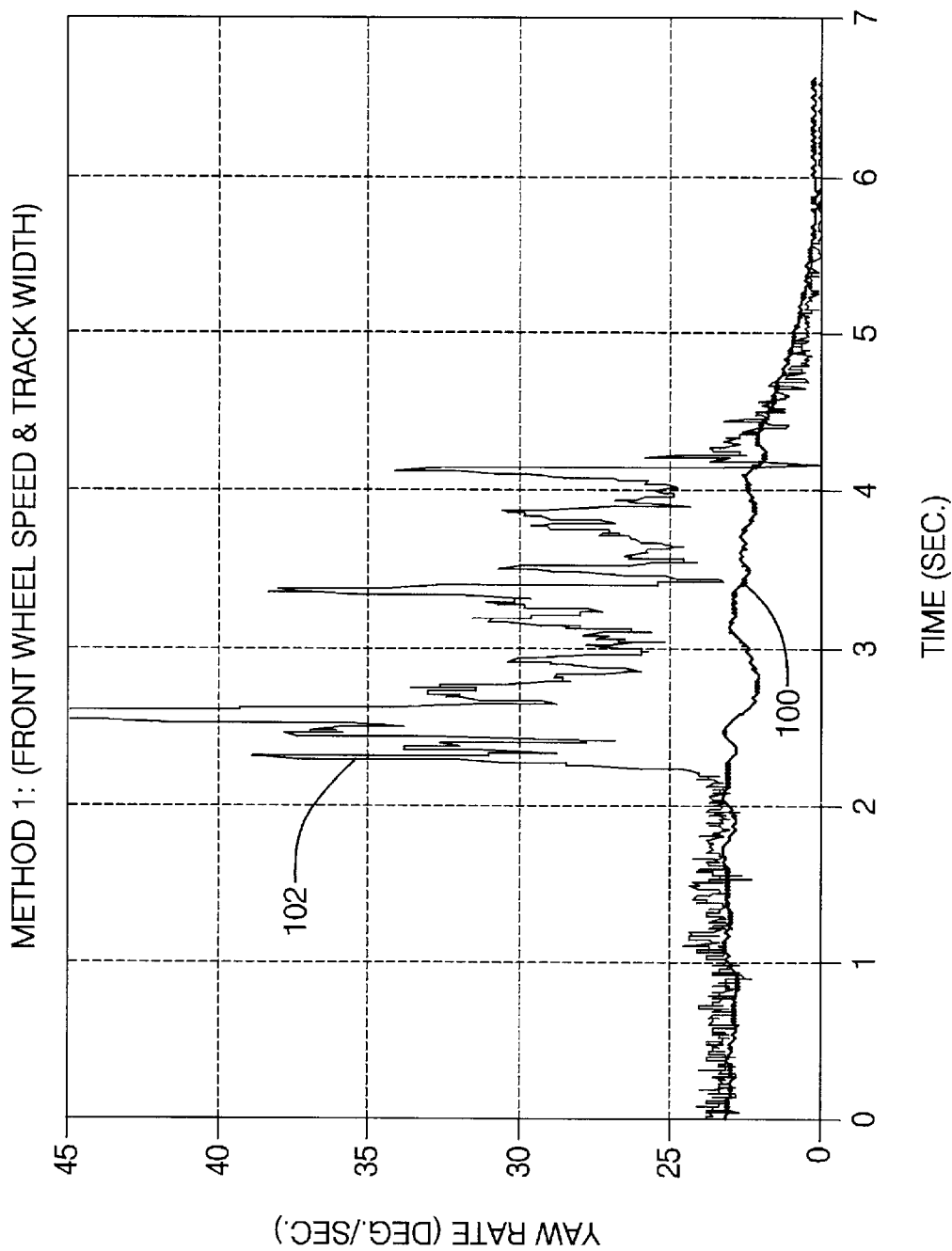
FIGS. 14–17 illustrate actual and measured yaw rates using the four different yaw rate estimations of FIGS. 6–9.
Figure 15:
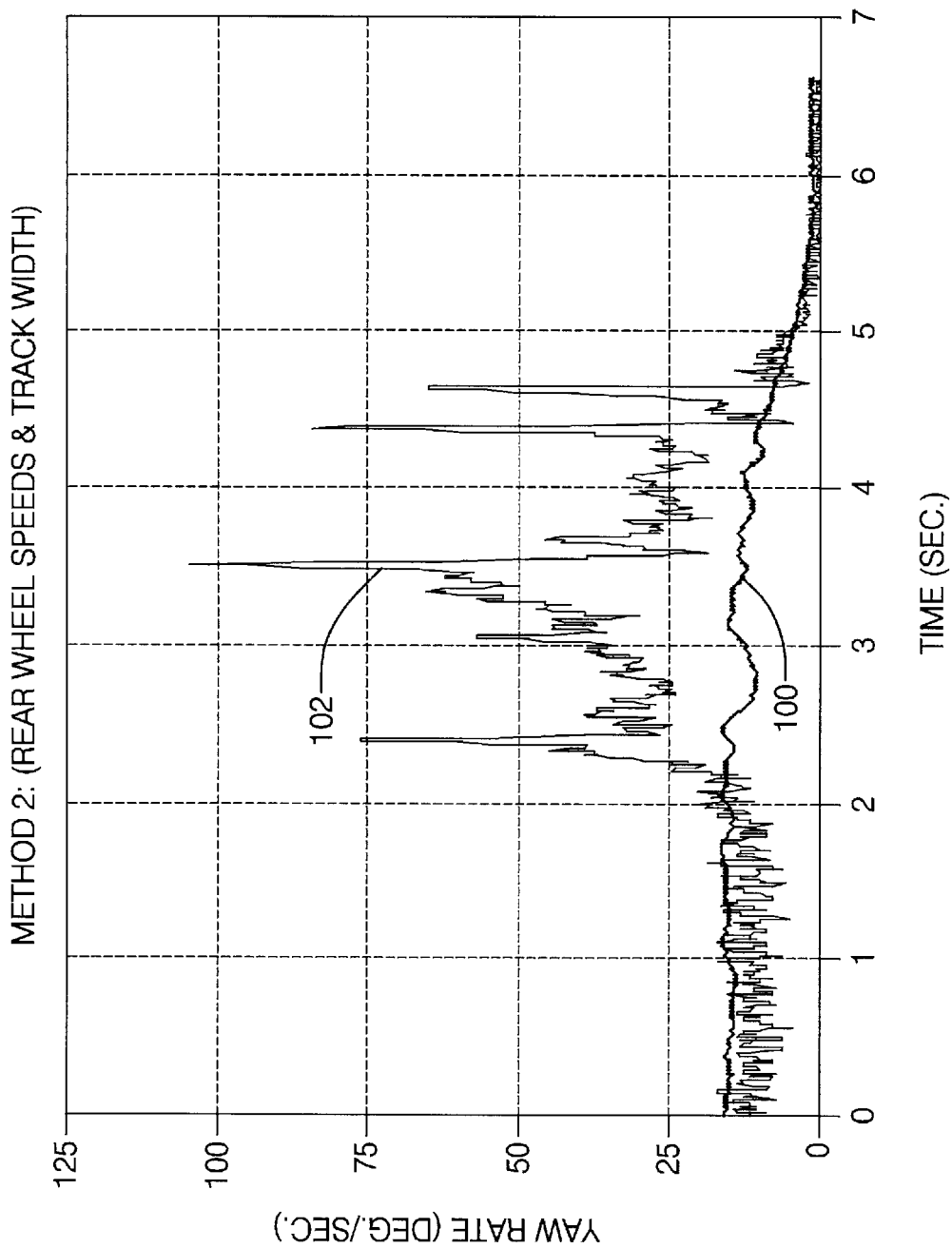
Figure 16:
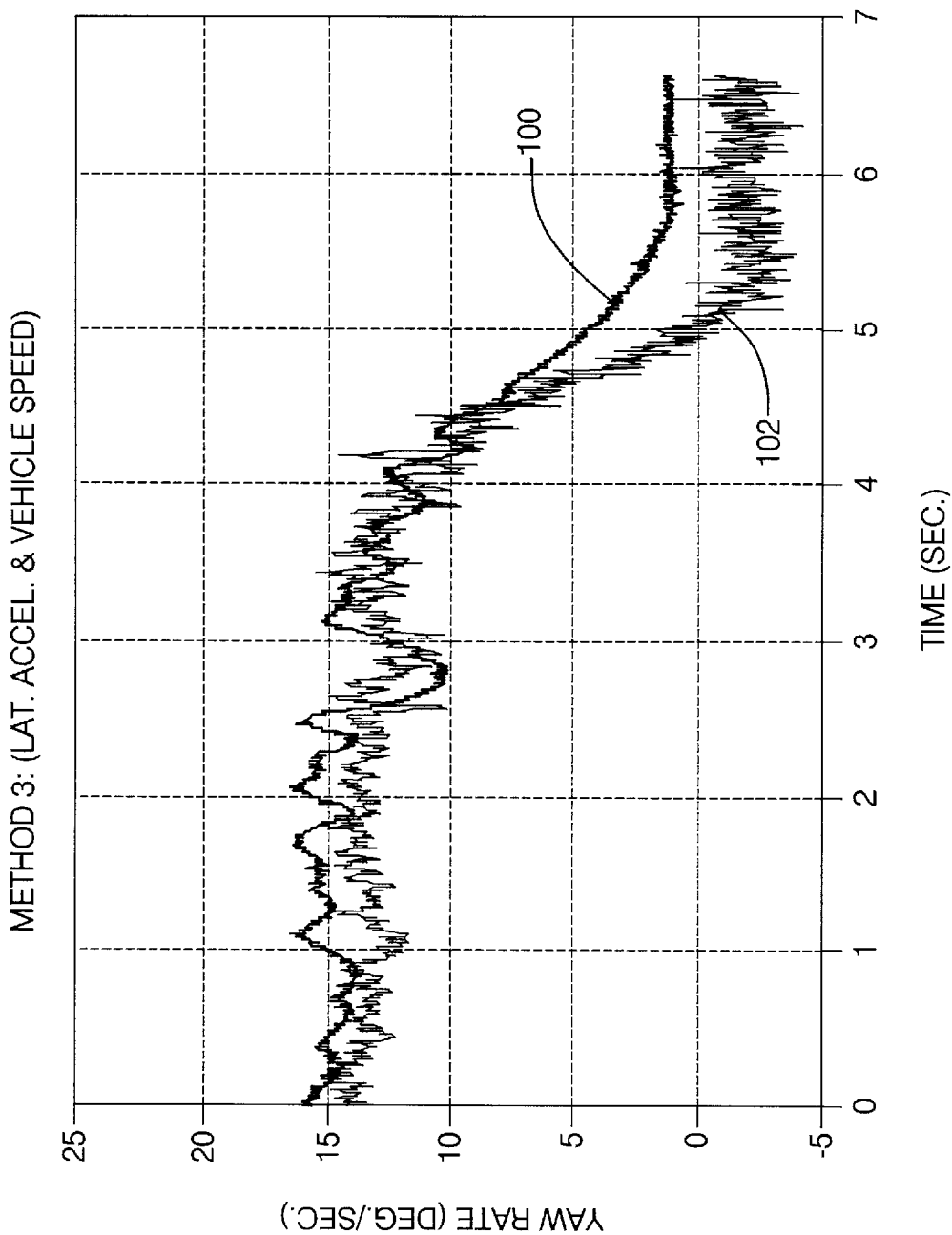
Figure 17:
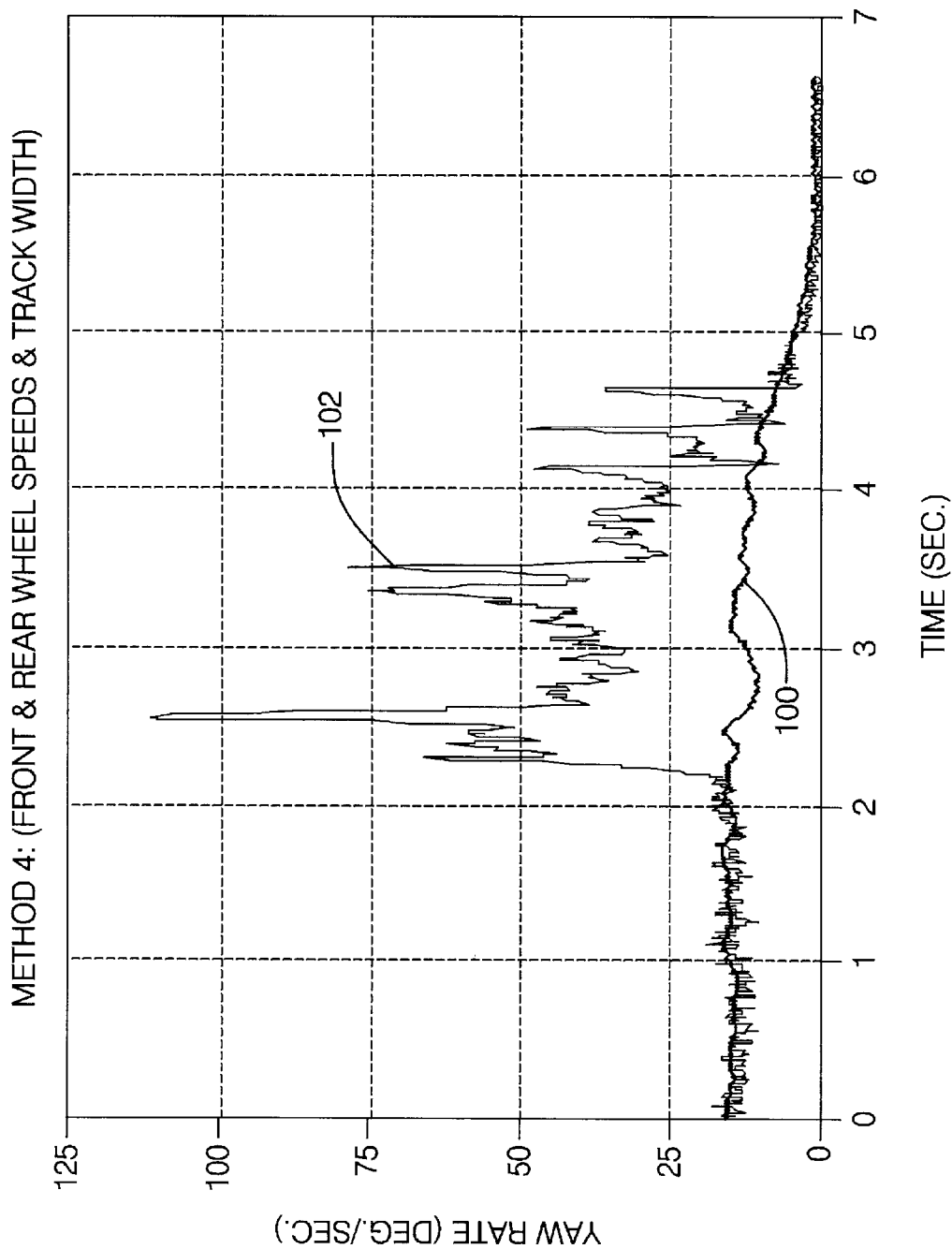

However, referring now to FIG. 16, the third method which does not require wheel speed information for yaw rate estimation is not susceptible to the errors reflected in FIGS. 14, 15, and 17 and maintains a good correlation where the other methods fail. However, as expected and discussed above, the third method using lateral acceleration signal 99 and vehicle speed signal 78 begins to loose its accuracy as the vehicle speed approaches zero. More specifically with reference to FIG. 16, the third method estimated signal 102 begins to diverge from and underestimate the actual yaw rate sensor measured signal 100 at about 4.5 seconds. But it is at about this same time frame, i.e., 4.5 seconds, that the other methods employing the wheel speed based estimators regain their correlation with the actual measured signal 100 corresponding to yaw rate sensor signal 81.

Figure 18:
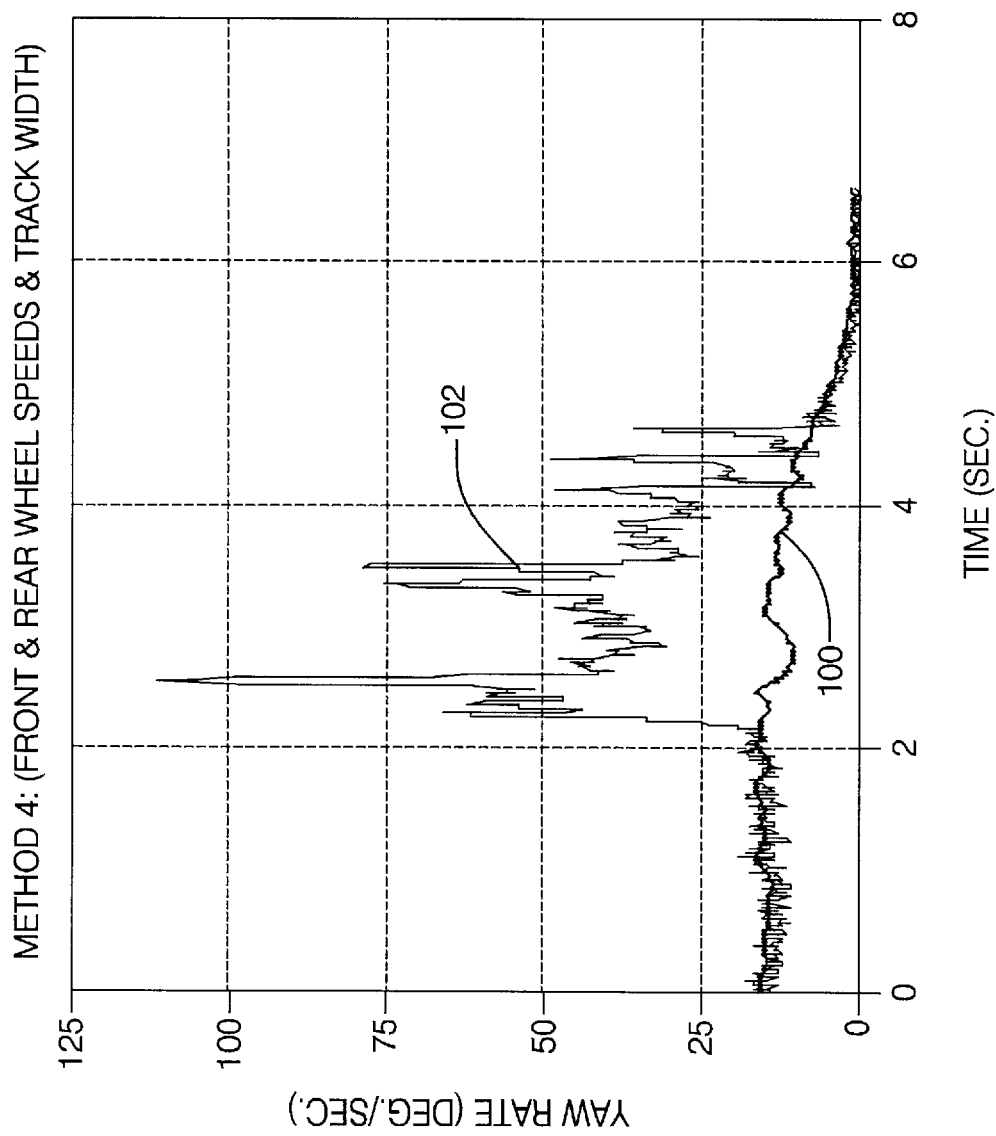
FIG. 18 illustrates the correlation between actual and measured yaw rates with a first exemplary yaw rate estimator using front and rear wheel based estimation functions.
Figure 19:
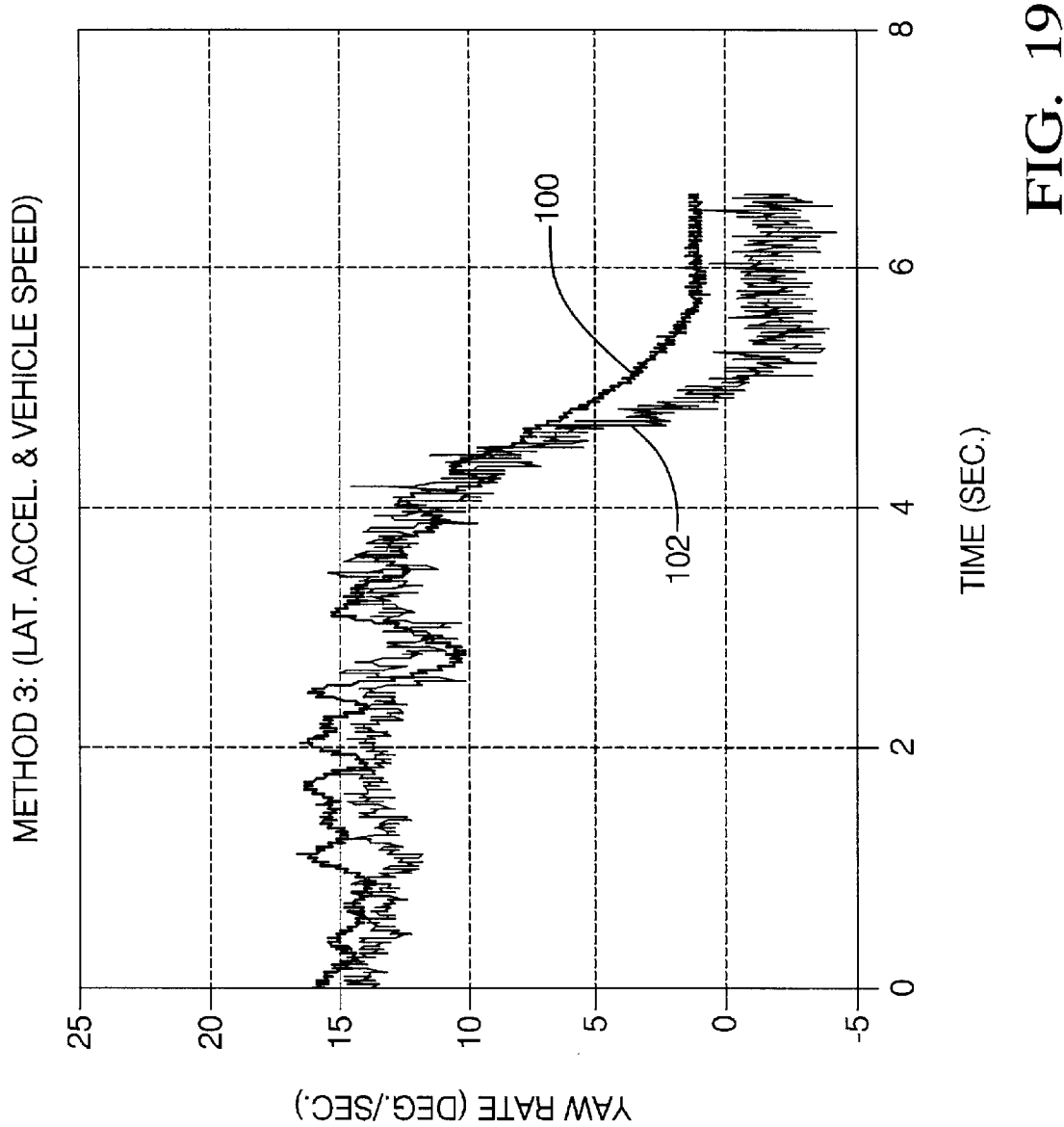
FIG. 19 illustrates the correlation between actual and measured yaw rates with a second exemplary yaw rate estimator using a lateral acceleration based estimation function.

In an exemplary embodiment exemplified with reference to FIGS. 18–21, an enhanced yaw rate estimator includes transitioning between the two estimators plotted in FIGS. 16 and 17 and reproduced in FIGS. 19 and 18, respectively, based on the vehicle operating condition. An exemplary embodiment includes employing the wheel speed based approach of the fourth method along having knowledge of the vehicle track width as a primary detection method under linear and low speed vehicle operating conditions, while the lateral acceleration based technique of the third method is employed under the other conditions. A condition that initiates the transition is a preselected error threshold value representing a difference in values between the actual measured yaw rate 100 and the primary (linear) estimated yaw rate 102. It should be noted that a similar threshold, in the form of a phase detector PD gain, is presently employed in existing vehicle stability enhancement systems to initiate a vehicle yaw correction. In this manner, the error threshold for transitioning between estimators should be lower than the threshold setting used to initiate vehicle yaw correction.

Figure 20:
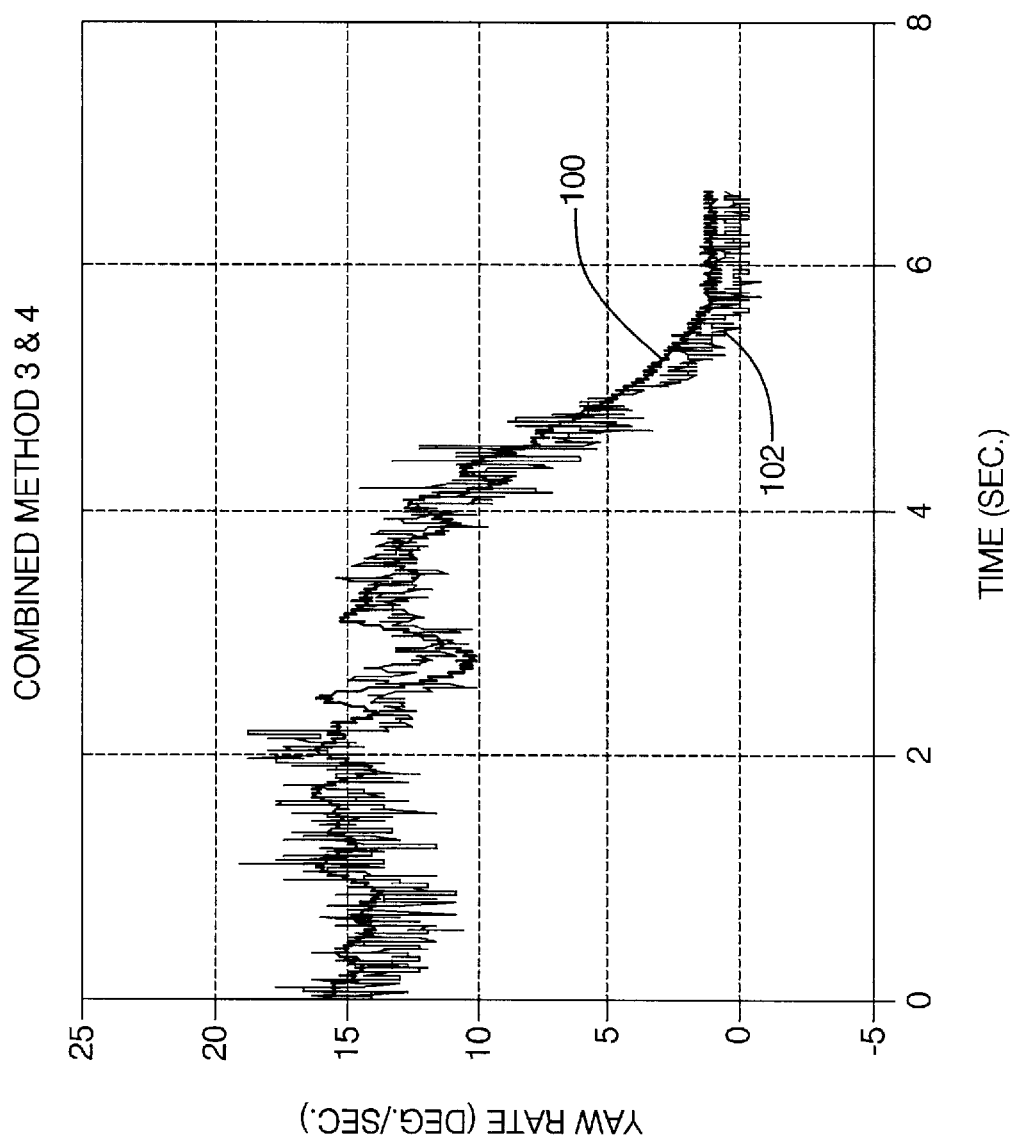
FIG. 20 illustrates the correlation between actual and measured yaw rates with the first and second exemplary yaw rate estimators combined.

FIG. 20 illustrates employment of the enhanced yaw rate estimator over both linear and nonlinear vehicle operating conditions that is achieved by combining the two estimators of the third and fourth methods, using wheel speed based estimation and lateral acceleration based estimation, respectively. As illustrated in FIG. 20, this approach results in more accurate yaw rate estimation than either of the individual methods.

Figure 21:
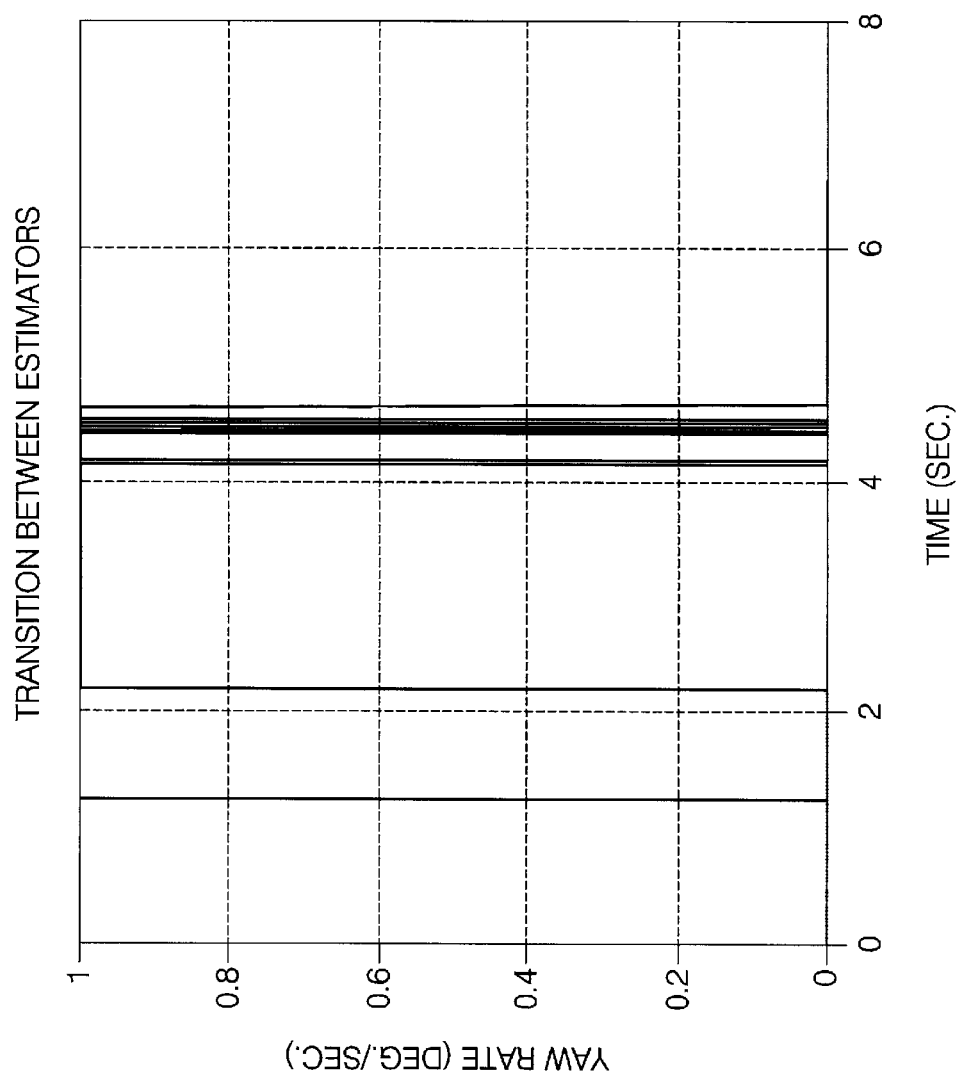
FIG. 21 illustrates the transitions between the two exemplary estimators of FIGS. 18 and 19.

Referring now to FIG. 21, the transition between the two estimators illustrated in FIGS. 18 and 19 is shown as a simple threshold condition, but is contemplated to be made more robust by implementing counters, moving averages or other means to prevent reacting to a short transient fault or noise above the error threshold selected between an actual yaw rate measurement indicated by signal 81 from yaw rate sensor 80 and a wheel speed based yaw rate estimation signal. It is also contemplated that the error threshold can also be made adaptive depending on the confidence in the technique to catch faults in the mode of operation. More specifically, FIG. 21 illustrates the transition periods for yaw rate estimation using either wheel speed based estimation or lateral acceleration based estimation depending on the variance from the selected threshold value for switching between the two estimators. For example, FIG. 21 illustrates the transition periods when the yaw rate error threshold is set to a value of 4 degrees per second. At a time period between 1 and 2 seconds with reference to FIG. 21, it will be seen that a transition between estimators occurs corresponding to a difference of more than 4 degrees per second in yaw rate between actual measured 100 and estimated 102 yaw rates with respect to the same time period in FIG. 18. More specifically, this time period illustrates that the linear estimator using wheel speed based estimation underestimates the actual measured yaw rate 100 by more than 4 degrees per second causing a transition to the nonlinear lateral acceleration based estimator. Referring to FIGS. 19 and 21, it will be seen that after about 4.5 seconds, there is no further transitions from the linear estimator to the nonlinear estimator using lateral acceleration based estimation for yaw rate, as the effective vehicle speed approaches zero and there is negligible lateral acceleration at low speeds. In this case, the wheel based estimation for yaw rate is more reliable as indicated with reference to FIG. 18. When the transitions indicated in FIG. 21 occur, an estimated yaw rate for both linear and nonlinear vehicle operating conditions in the above described driving maneuver are reflected in FIG. 20. It will be seen referring to FIG. 20 that by transitioning between the linear and nonlinear yaw rate estimators, an estimated yaw rate signal 102 more closely correlates with an actual measured yaw rate signal 100 over both linear and nonlinear vehicle operating conditions for diagnosis of a yaw rate sensor fault.

The above-described methodology for enhanced yaw rate estimation provides a diagnostic algorithm for detecting a yaw rate sensor fault. More specifically, the controller employs a linear yaw rate estimator or wheel speed based yaw rate estimation as a reference to check against a yaw rate sensor measurement as a default. At a point that the difference between the linear reference estimate and yaw rate sensor measurement differ by more that a preselected amount, the controller transitions to a nonlinear estimate or lateral acceleration based estimation as the new reference to check for correlation with the yaw rate sensor measurement output. If this nonlinear estimate does not correlate with the yaw rate sensor measurement within a selected tolerance value, the controller sets a yaw rate sensor fault flag and indicates the same. Furthermore, as the speed of a vehicle approaches a speed of less than 5 kph, the controller transitions from a nonlinear estimator to the linear estimator, as the nonlinear estimate depends on the effective vehicle speed which loses its reliability below 5 kph or where lateral acceleration is near zero.

Figure 22:
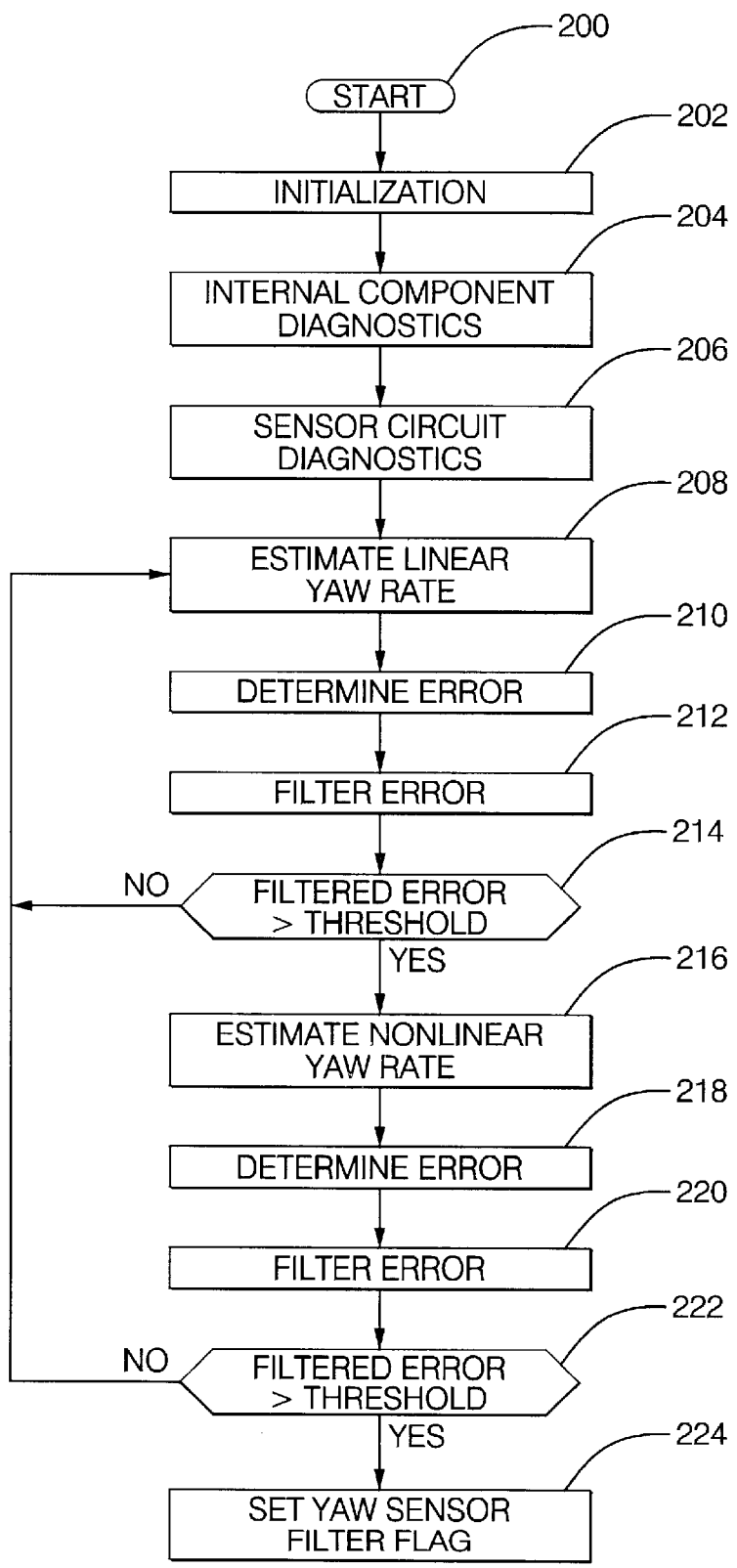
FIG. 22 is a flow diagram illustrating a series of operations for diagnosing a yaw rate sensor.

More specifically, the diagnostic begins at block 200 of the routine of FIG. 22 following application of ignition power to the controller 68. The operations beginning at the step 200 may periodically repeat while power is applied to the controller 68, such as about every ten milliseconds through a standard iterative controller timer interrupt procedure. Following the block 200, initialization operations are executed at a next block 202 including operations to properly reset and prepare sensors and actuators of FIG. 1 for use in active brake control diagnostics in accord with this disclosure and in accordance with controller, actuator and sensor manufacturer specifications.

Following such initialization operations, internal component diagnostics are carried out for the accelerometer 98, yaw rate sensor 80 and steering angle sensor 61 of FIG. 1, as may be provided by manufacturers of such sensors and as described in commercially available manufacturer diagnostic specifications for such conventional sensors. Following such internal diagnostics at block 204, sensor circuit diagnostics are carried out at a next block 206 which provides for continuous monitoring of sensor output signals to diagnose short circuit and open circuit conditions of the sensor and its associated circuitry.

If the above diagnostics are met, yaw rate sensor correlation are carried out by estimating actual vehicle yaw rate using wheel speed based estimation at a next block 208 as a function of driven and undriven wheel speed information generated from wheel speed sensors 28, 30, 32, and 34 of FIG. 1. Yaw rate error ERROR is next determined at a block 210 as a difference between the measured yaw rate from the signal on line 81 from sensor 80 of FIG. 1 (following any standard filtering that may be required) and the linear estimated actual yaw rate.

The error is next optionally filtered by passing it through a simple lag filter with approximately a two Hertz bandwidth at a block 212. The filtered error is then compared to a calibrated error threshold at a block 214. If the error is within the threshold, then proceed to block 210. If the error exceeds the threshold, a transition to estimating vehicle yaw rate using lateral acceleration based estimation occurs at block 216 as a function of lateral acceleration and effective vehicle speed information generated as signals 99 and 78, respectively. It will be recognized that tire scrubbing effects during significant acceleration turns on such surfaces as concrete or side slip effects on ice can lead to misleading yaw rate estimates from the wheel speed signal information, leading to misleading high yaw rate error.

Yaw rate error ERROR is next determined at a block 218 as a difference between the measured yaw rate from the signal on line 81 from sensor 80 of FIG. 1 (following any standard filtering that may be required at block 220) and the nonlinear estimated actual yaw rate determined at block 216. The filtered error is then compared to a calibrated error threshold at a block 222. If the error is within the threshold, then proceed to block 210. If the error exceeds the threshold, a yaw rate sensor isolated flag is then set at a next block 224 to indicate that the yaw sensor is determined as being responsible for a fault condition in the active brake control system. Although FIG. 22 has been described with reference to an active brake control system, the above described diagnostic may be employed with any vehicle stability control system including, but not limited to, four wheel steering, rear wheel steering, and integrated steer/brake control systems.

In addition, the present teachings may be embodied in the form of computer-implemented processes and apparatuses for practicing those processes. The present teachings can also be embodied in the form of computer program code containing instructions embodied in tangible media, such as floppy diskettes, CD-ROMs, hard drives, or any other computer-readable storage media, wherein, when the computer program code is loaded into and executed by a computer, the computer becomes an apparatus for practicing the teachings of the present disclosure.

The teachings of the present disclosure can be embodied in the form of computer program code, for example, whether stored in a storage medium, loaded into and/or executed by a computer, or as data signal transmitted, whether by a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the teachings herein. When implemented on a general-purpose microprocessor, the computer program code segments configure the microprocessor to create specific logic circuits.

The vehicle performance observed above with only brake control stability assist will be greatly improved if the brake system is integrated with a steering control stability assist, especially rear steering assist. Testing has shown nearly equal stability capability for control with combined braking/steering and that of braking only. The advantage for the combined braking/steering system is a quieter system with an overall reduction in brake wear events. The use of steering also minimizes the loss in vehicle speed created by partial braking. With these factors in mind, it seems the use of a sensitive yaw rate sensor diagnostic for the combined steering/braking stability system will provide only a small sacrifice in vehicle handling performance. On the other hand the diagnostic will provide confidence that a sensor faulted to worst condition will never create an undesired veering of the vehicle with limited time to correct by driver input.

The above described enhanced yaw rate estimation and diagnostic for a failed yaw rate sensor uses information from other existing vehicle sensors that are available to enhance the estimation for correlation with an actual measurement and the resulting diagnostic. This allows a reliable estimation even under ABS braking conditions or at high lateral accelerations of the vehicle.

While the disclosure has been made with reference to exemplary embodiments, it will be understood by those of ordinary skill in the pertinent art that various changes may be made and equivalents may be substituted for the elements thereof without departing from the scope of the present disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method for estimating the yaw rate of a vehicle, comprising:
   receiving at least one signal indicative of a vehicular lateral acceleration;
   receiving at least one signal indicative of a vehicular velocity;
   providing a plurality of yaw rate estimators;
   selecting a first yaw rate estimator from said plurality of yaw rate estimators in response to at least one of said received signals;

estimating a first yaw rate in accordance with the selected said first yaw rate estimator and a corresponding at least one of said received signals;

measuring a yaw rate with a yaw rate sensor;

comparing said measured yaw rate with said first estimated yaw rate;

detecting an inaccurate measured yaw rate in accordance with the comparison when the comparison is not within a selected threshold value; and selecting a second yaw rate estimator from said plurality of yaw rate estimators upon said detection of said inaccurate yaw rate.

2. The method as defined in claim 1, further comprising:

estimating a second yaw rate in accordance with said selecting said second yaw rate estimator and another signal of said received signals.

3. The method as defined in claim 2, further comprising:

comparing said measured yaw rate with said second yaw rate; and detecting an inaccurate measured yaw rate in accordance with the comparison when the comparison is not within said selected threshold value.

4. The method as defined in claim 3, further comprising:

generating a yaw rate sensor fault signal indicative of a failed yaw rate sensor.

5. The method as defined in claim 2, wherein said at least one signal indicative of said vehicular velocity includes a lateral acceleration signal and said second yaw rate estimator estimates said second yaw rate using said lateral acceleration signal and a signal indicative of effective vehicle velocity.

6. The method as defined in claim 5, wherein said signal indicative of effective vehicle velocity is generated from a vehicle transmission.

7. The method as defined in claim 2, wherein said at least one signal indicative of said vehicular velocity includes a wheel velocity signal and said first yaw rate estimator estimates said first yaw rate using at least two wheel velocities and a track width therebetween.

8. The method as defined in claim 7, wherein said first yaw rate estimator is selected when an effective vehicular velocity is less than about 5 kph.

9. The method as defined in claim 1, wherein said first yaw rate estimator is a wheel velocity based function configured to estimate yaw rate of the vehicle.

10. The method as defined in claim 9, wherein said wheel velocity based function is set as a default for estimation of yaw rate.

11. A method for estimating the yaw rate of a vehicle, comprising:

providing a plurality of signals indicative of one of a wheel speed and a lateral acceleration of the vehicle;

estimating a first yaw rate using at least two wheel speed signals from opposing wheels and associated track width therebetween;

correlating an actual measured yaw rate with said first yaw rate to determine if said first yaw rate is invalid, wherein said correlating includes determining a difference between said actual measured yaw rate and said first yaw rate; and estimating a second yaw rate using an actual measured lateral acceleration and an effective vehicle velocity if said first yaw rate is invalid, wherein said first yaw rate is invalid if a difference between said actual measured yaw rate and said first estimated yaw rate is not within a selected threshold.

12. The method as defined in claim 11, further comprising:

correlating said actual measured yaw rate with said second yaw rate to determine if said second yaw rate is invalid;

determining that said actual measured yaw rate is invalid if a difference between said actual measured yaw rate and said second yaw rate is not within a selected threshold; and generating a signal indicative of a failed yaw rate sensor if said actual measured yaw rate is determined to be invalid.

13. A storage medium encoded with a machine readable computer program code for estimating a yaw rate of a vehicle, the storage medium including instructions for causing a computer to implement a method, the method comprising:

receiving at least one signal indicative of a vehicular lateral acceleration;

receiving at least one signal indicative of a vehicular velocity;

providing a plurality of yaw rate estimators;

selecting a first yaw rate estimator from said plurality of yaw rate estimators in response to at least one of said received signals;

estimating a first yaw rate in accordance with the selected said first yaw rate estimator and at least one of said received signals;

receiving a signal indicative of a measured yaw rate from a yaw rate sensor;

comparing said measured yaw rate with said first yaw rate;

detecting an inaccurate measured yaw rate in accordance with the comparison when the comparison is not within a selected threshold value; and selecting a second yaw rate estimator from said plurality of yaw rate estimators upon said detection of said inaccurate yaw rate.

14. A computer data signal for estimating yaw rate of a vehicle, the computer data signal comprising code configured to cause a processor to implement a method, the method comprising:

receiving at least one signal indicative of a vehicular lateral acceleration;

receiving at least one signal indicative of a vehicular velocity;

providing a plurality of yaw rate estimators;

selecting a first yaw rate estimator from said plurality of yaw rate estimators in response to at least one of said received signals; and estimating a first yaw rate in accordance with the selected said first yaw rate estimator and at least one of said received signals;

receiving a signal indicative of a measured yaw rate from a yaw rate sensor;

comparing said measured yaw rate with said first yaw rate;

detecting an inaccurate measured yaw rate in accordance with the comparison when the comparison is not within a selected threshold value; and selecting a second yaw rate estimator from said plurality of yaw rate estimators upon said of said inaccurate yaw rate.

15. A controller for providing an estimated yaw rate algorithm for a vehicle, the controller comprising:

means for providing a plurality of signals indicative of an estimated yaw rate;

means for correlating at least a first of the provided signals to determine if it is within a threshold with respect to an actual measured yaw rate signal from a yaw rate sensor;

means for correlating at least a second of the provided signals to determine if it is within the threshold with respect to the actual measured yaw rate signal from said yaw rate sensor;

means for transitioning between said first of the provided signals and said second of the provided signals when one of said first and second of the provided signals is invalid.

16. The controller of claim 15, further comprising:

a means to indicate a fault of said yaw rate sensor when said first and second of the provided signals is invalid.

* * * * *

UNITED STATES PATENT AND TRADEMARK OFFICE
CERTIFICATE OF CORRECTION

| | | |
|---|---|---|
| PATENT NO. | : 6,623,089 B2 | Page 1 of 1 |
| APPLICATION NO. | : 10/232087 | |
| DATED | : September 23, 2003 | |
| INVENTOR(S) | : Sanket Amberkar | |

It is certified that error appears in the above-identified patent and that said Letters Patent is hereby corrected as shown below:

In Column 12

Line 66, after "upon said" insert -- detection --

Signed and Sealed this

Fourth Day of September, 2007

JON W. DUDAS
*Director of the United States Patent and Trademark Office*